(12) United States Patent
Ueda

(10) Patent No.: US 12,453,569 B2
(45) Date of Patent: *Oct. 28, 2025

(54) TREATMENT TOOL FOR ENDOSCOPE

(71) Applicant: FUJIFILM Corporation, Tokyo (JP)

(72) Inventor: Yoshihiro Ueda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 549 days.

This patent is subject to a terminal disclaimer.

(21) Appl. No.: 17/665,716

(22) Filed: Feb. 7, 2022

(65) Prior Publication Data
US 2022/0151650 A1    May 19, 2022

Related U.S. Application Data

(63) Continuation of application No. PCT/JP2020/033685, filed on Sep. 4, 2020.

(60) Provisional application No. 63/067,295, filed on Aug. 18, 2020, provisional application No. 62/896,581, filed on Sep. 6, 2019.

(51) Int. Cl.
*A61B 17/29* (2006.01)

(52) U.S. Cl.
CPC .. *A61B 17/2909* (2013.01); *A61B 2017/2905* (2013.01); *A61B 2017/2912* (2013.01); *A61B 2017/2946* (2013.01)

(58) Field of Classification Search
CPC ........ A61B 17/2909; A61B 2017/2905; A61B 2017/2912; A61B 2017/2946
See application file for complete search history.

(56) References Cited

U.S. PATENT DOCUMENTS

| | | | |
|---|---|---|---|
| 5,649,955 A | 7/1997 | Hashimoto et al. | |
| 6,248,062 B1 | 6/2001 | Adler et al. | |
| 6,458,074 B1 | 10/2002 | Matsui et al. | |
| 7,918,845 B2 * | 4/2011 | Saadat | A61B 1/018 606/1 |
| 12,213,692 B2 * | 2/2025 | Ueda | A61B 17/2909 |

(Continued)

FOREIGN PATENT DOCUMENTS

| | | |
|---|---|---|
| JP | H05-21913 U | 3/1993 |
| JP | H08-33644 A | 2/1996 |

(Continued)

OTHER PUBLICATIONS

International Search Report issued in PCT/JP2020/033685; mailed Nov. 10, 2020.

(Continued)

*Primary Examiner* — Tan-Uyen T Ho
*Assistant Examiner* — Cherie M Poland
(74) *Attorney, Agent, or Firm* — Studebaker Brackett PLLC

(57) ABSTRACT

A treatment tool for an endoscope includes a transmitting part that transmits an operation of the operating part to a grip part of a distal end part and a bendable part. The operating part has an operating member that is rotatable and translatable. The transmitting part has a first member to which rotation and translation of the operating member are transmitted and a second member to which only the rotation of the operating member is transmitted. The grip part is closed by the translation of the first member, and the bendable part is bent by the rotation of the second member.

9 Claims, 40 Drawing Sheets

(56) References Cited

U.S. PATENT DOCUMENTS

| | | | |
|---|---|---|---|
| 12,343,031 B2* | 7/2025 | Ueda | A61B 17/29 |
| 2004/0138529 A1* | 7/2004 | Wiltshire | A61B 1/0055 |
| | | | 600/144 |
| 2015/0005813 A1 | 1/2015 | Maslanka et al. | |
| 2015/0157192 A1* | 6/2015 | Piskun | A61B 1/00085 |
| | | | 600/114 |
| 2016/0278800 A1 | 9/2016 | Hayami et al. | |
| 2016/0374658 A1* | 12/2016 | Piskun | A61B 1/00082 |
| | | | 600/204 |
| 2018/0185018 A1* | 7/2018 | Piskun | A61B 1/3132 |

FOREIGN PATENT DOCUMENTS

| | | |
|---|---|---|
| JP | 2001-212078 A | 8/2001 |
| JP | 2002-330973 A | 11/2002 |
| JP | 2012-513845 A | 6/2012 |
| JP | 2015-97818 A | 5/2015 |
| WO | 2010/078344 A1 | 7/2010 |

OTHER PUBLICATIONS

Written Opinion issued in PCT/JP2020/033685; mailed Nov. 10, 2020.

An Office Action; "Notice of Reasons for Refusal," mailed by the Japanese Patent Office on Dec. 6, 2022, which corresponds to Japanese Patent Application No. 2021-544068 and is related to U.S. Appl. No. 17/665,716; with English language translation.

* cited by examiner

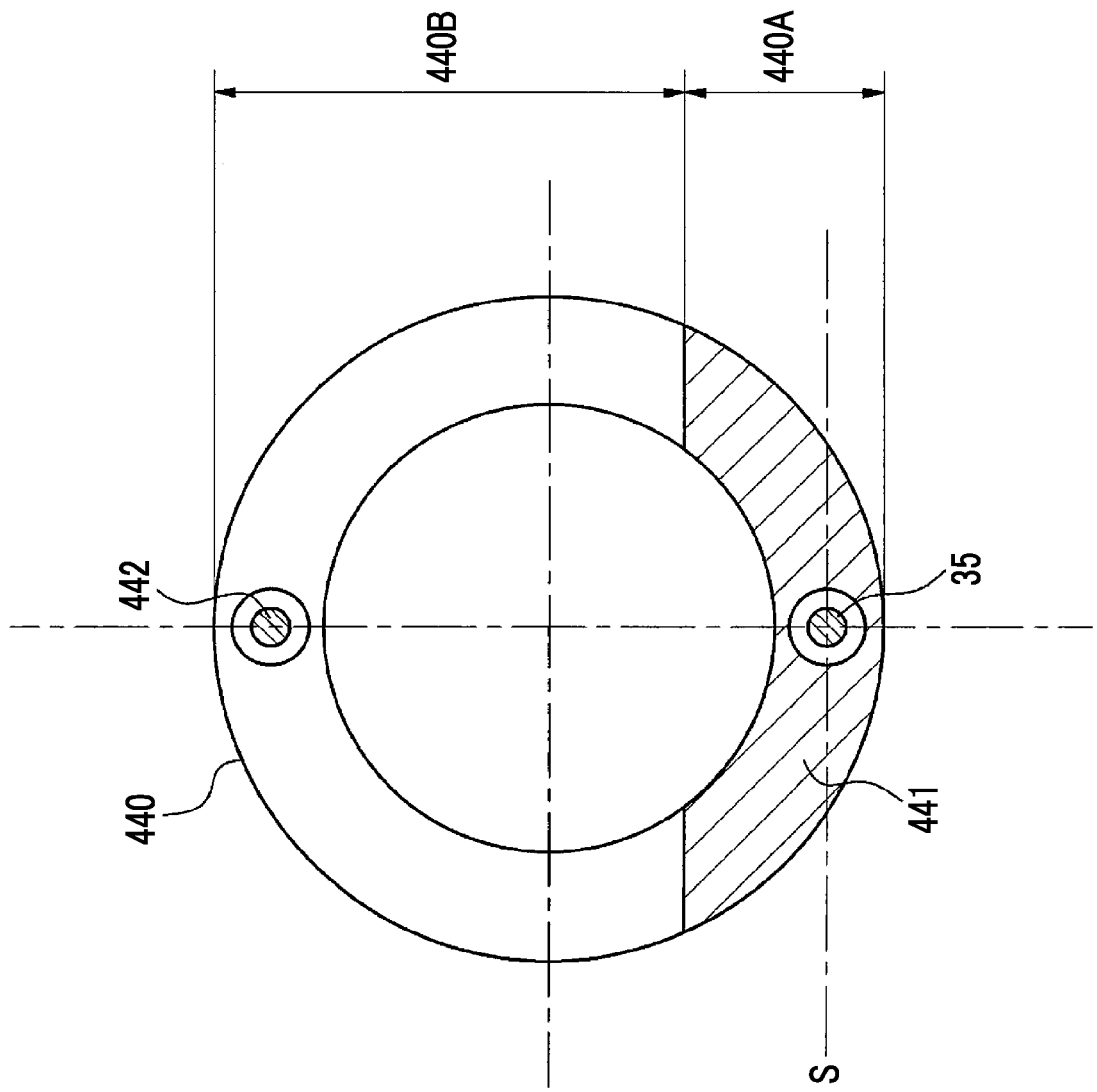

TREATMENT TOOL FOR ENDOSCOPE

CROSS REFERENCE TO RELATED APPLICATION

This is a continuation of International Application No. PCT/JP2020/033685 filed on Sep. 4, 2020, and claims priority from U.S. Provisional Application No. 62/896,581 filed on Sep. 6, 2019 and U.S. Provisional Application No. 63/067,295 filed on Aug. 18, 2020, the entire disclosures of which are incorporated herein by reference.

BACKGROUND OF THE INVENTION

1. Field of the Invention

The present invention relates to a treatment tool for an endoscope.

2. Description of the Related Art

Various types of treatment are performed on a living body by combining an endoscope and a treatment tool for an endoscope. As an example of treatment, endoscopic submucosal dissection (ESD) is known. An interior wall such as the esophagus, stomach, and large intestine to which ESD is applied consists of three layers including a mucous membrane layer, a submucosal layer, and a muscular layer. In ESD, a lesion part of the mucous membrane layer including the submucosal layer is peeled off, and it is also possible to collectively excise, for example, a relatively large lesion part which exceeds 2 cm.

An endoscope described in JP2001-212078A is used in, for example, ESD, and comprises a first treatment tool insertion channel and a second treatment tool insertion channel. The first treatment tool insertion channel is open to a distal end of an insertion part of the endoscope, and a first erecting mechanism that erects a treatment tool in a first direction (for example, an up-and-down direction) is provided at a distal end opening portion of the first treatment tool insertion channel. Also the second treatment tool insertion channel is open to the distal end of the insertion part of the endoscope, and a second erecting mechanism that erects the treatment tool in a second direction (for example, a right-and-left direction) different from the first direction is provided at a distal end opening portion of the second treatment tool channel.

In a case where the endoscope described in JP2001-212078A is used in ESD, a grip forcep is inserted into the first treatment tool insertion channel, and an incision tool such as an electric scalpel is inserted into the second treatment tool insertion channel. The grip forcep and the incision tool approach a lesion part from the side of the lesion part along the interior wall. First, as the lesion part is gripped by the grip forcep and the grip forcep gripping the lesion part is erected by the first erecting mechanism of the endoscope, the lesion part is lifted. Then, as a lower part of the lifted lesion part is incised by the incision tool and the incision tool is swung right and left by the second erecting mechanism of the endoscope, incision proceeds. In this manner, the lesion part including the submucosal layer is gradually peeled off.

In addition, also a treatment tool for an endoscope that can perform treatment including both of gripping and incision is known. A treatment tool for an endoscope described in JP2002-330973A comprises a sheath, a forcep member provided at a distal end part of the sheath, and a high-frequency knife inserted in the sheath. The forcep member is opened and closed by a first operating part provided at a proximal end part of the sheath. The high-frequency knife protrudes from between a pair of arm portions of the forcep member and is moved forward and backward in an axial direction of the sheath by a second operating part provided at the proximal end part of the sheath.

SUMMARY OF THE INVENTION

In the endoscope described in JP2001-212078A, in order to grip and lift the lesion part, an operation of the grip forcep for gripping the lesion part and an operation of the endoscope for erecting the grip forcep are necessary, thereby complicating the operation.

The treatment tool for an endoscope described in JP2002-330973A can only pull the lesion part gripped by the forcep member in the axial direction of the sheath with an operation of the treatment tool alone. A bending operation of the endoscope is necessary to lift the lesion part, and the visual field of the endoscope moves in response to the bending operation of the endoscope, thereby increasing the difficulty of treatment.

The present invention is devised in view of the circumstances described above, and an object thereof is to provide a treatment tool for an endoscope that can easily perform gripping of a lesion part and lifting of the gripped lesion part with an operation of the treatment tool alone.

According to an aspect of the present invention, there is provided a treatment tool for an endoscope comprising an insertion part that has a distal end part provided with an openable and closable grip part and a bendable part, which is provided adjacent to the distal end part and is bendable, and that is insertable into a body, an operating part into which an operation of closing the grip part and an operation of bending the bendable part are input, and a transmitting part that transmits the operations of the operating part to the grip part and the bendable part. The operating part has an operating member that is rotatable about a first rotation axis and is translatable along the first rotation axis. The transmitting part has a transmitting member that extends from the operating member to the insertion part and is capable of transmitting a rotation and translation of the operating member, a first member that is rotatable about a second rotation axis which is the same as or parallel to a central axis of the insertion part, is translatable along the second rotation axis, and is connected to a distal end part of the transmitting member, and a second member that is rotatable about the second rotation axis and is not translatable along the second rotation axis. The first member and the second member have engaging parts respectively that allow relative translation along the second rotation axis by engaging with each other and prevent a relative rotation about the second rotation axis. The grip part is closed based on any one of translation of the first member or a rotation of the second member. The bendable part is bent based on the other one of the translation of the first member or the rotation of the second member. According to another aspect of the present invention, there is provided a treatment tool for an endoscope comprising an insertion part that has a distal end part, which is provided with an openable and closable grip part, and a bendable part, which is provided adjacent to the distal end part and is bendable, and that is insertable into a body, an operating part into which an operation of closing the grip part and an operation of bending the bendable part are input, and a transmitting part that transmits the operations of the operating part to the grip part and the bendable part. The operating part has a gripped part that is gripped by a user and an operating member that is rotatable about a first rotation axis with respect to the gripped part and is translatable along the first rotation axis with respect to the gripped part. The transmitting part has a first transmitting member that extends from the operating member to the insertion part and closes the grip part in response to a rotation of the operating member and a second transmitting member that extends from the operating member to the insertion part and bends the bendable part in response to translation of the operating member.

With the present invention, it is possible to provide the treatment tool for an endoscope that can easily perform gripping of a lesion part and lifting of the gripped lesion part with an operation of the treatment tool alone.

BRIEF DESCRIPTION OF THE DRAWINGS

FIG. 41 is a view showing a cross section of the bendable part of FIG. 40.

DESCRIPTION OF THE PREFERRED EMBODIMENTS

Embodiment 1

Figure 1:
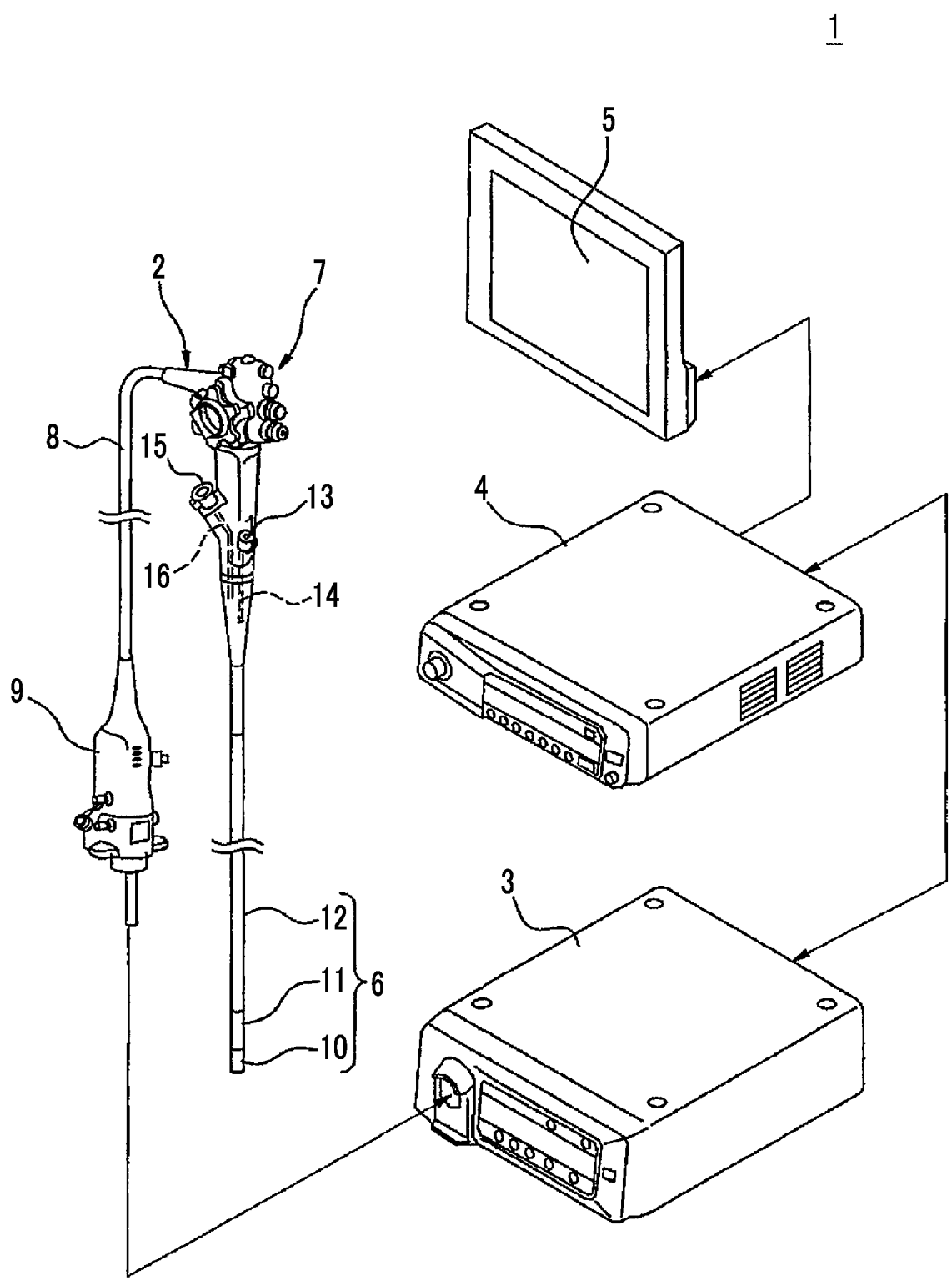
FIG. 1 is a view showing an example of an endoscope system, which is for describing Embodiment 1 of the present invention.

FIG. 1 shows an example of an endoscope system for describing Embodiment 1 of the present invention.

An endoscope system 1 comprises an endoscope 2, a light source device 3, and a processor 4. The endoscope 2 has an endoscope insertion part 6 that is inserted into a subject, an endoscope operating part 7 that is connected to the endoscope insertion part 6, and a universal cord 8 that extends from the endoscope operating part 7. The endoscope insertion part 6 is composed of an endoscope distal end part 10, an endoscope bendable part 11 that is connected to the endoscope distal end part 10, and an endoscope soft portion 12 that connects the endoscope bendable part 11 to the endoscope operating part 7.

An imaging apparatus including an imaging element is mounted on the endoscope distal end part 10. The endoscope bendable part 11 is configured to be bendable, and the bending of the endoscope bendable part 11 is operated by the endoscope operating part 7. In addition, the endoscope soft portion 12 is soft enough to be deformable along a shape of an insertion passage in the subject.

The endoscope operating part 7 is provided with an operation button for operating image pick-up using the imaging apparatus and an operation knob for operating the bending of the endoscope bendable part 11. In addition, the endoscope operating part 7 is provided with a first treatment tool insertion opening 13 and a second treatment tool insertion opening 15, into which the treatment tool for an endoscope is insertable. Inside the endoscope insertion part 6, a first treatment tool channel 14 that reaches the endoscope distal end part 10 from the first treatment tool insertion opening 13 and is open to an edge surface of the endoscope distal end part 10 and a second treatment tool channel 16 that reaches the endoscope distal end part 10 from the second treatment tool insertion opening 15 and is open to the edge surface of the endoscope distal end part 10 are provided.

A light guide and a cable are provided inside the endoscope insertion part 6, the endoscope operating part 7, and the universal cord 8. A connector 9 is provided at a terminal of the universal cord 8. The endoscope 2 is connected to the light source device 3 and the processor 4 via the connector 9.

Illumination light generated by the light source device 3 is guided to the endoscope distal end part 10 via the light guide and is emitted from the endoscope distal end part 10. In addition, operating power of the imaging element, a control signal for driving the imaging element, and an image signal output from the imaging element are transmitted between the processor 4 and the imaging apparatus via the cable. The processor 4 processes the input image signal to generate image data of an observation site in the subject, displays the generated image data on a monitor 5, and records the generated image data.

Figure 2:
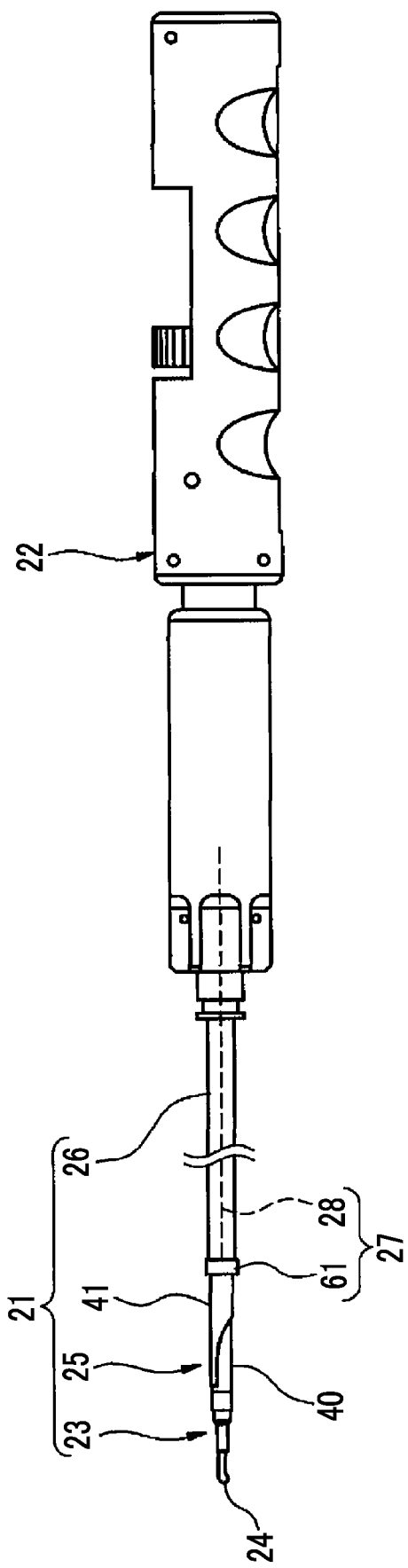
FIG. 2 is a view showing an example of a treatment tool for an endoscope, which is for describing Embodiment 1 of the present invention.

FIG. 2 shows an example of the treatment tool for an endoscope, which is for describing Embodiment 1 of the present invention.

A treatment tool for an endoscope 20 comprises an insertion part 21 that can be inserted into the first treatment tool channel 14 (see FIG. 1) and an operating part 22. The insertion part 21 has a distal end part 23 at which an openable and closable grip part 24 is provided, a bendable part 25 that is provided adjacent to an operating part side of the distal end part 23 and is bendable, and a soft portion 26 that connects the bendable part 25 to the operating part 22.

In a case where the insertion part 21 is inserted in the first treatment tool channel 14, the distal end part 23 and the bendable part 25 protrude from the edge surface of the endoscope distal end part 10 (see FIG. 1), and the soft portion 26 is accommodated in the first treatment tool channel 14. Similar to the endoscope soft portion 12, the soft portion 26 accommodated in the first treatment tool channel 14 is soft enough to be deformable along the shape of the insertion passage in the subject. The soft portion 26 can be configured, for example, such that an outer periphery of a screw pipe, which is formed by spirally winding a metal strip plate material, is covered with a mesh pipe formed by braiding a metal wire and an outer periphery of the mesh pipe is covered with a resin outer coat.

An operation of closing the grip part 24 (hereinafter, referred to as a closing operation) and an operation of bending the bendable part 25 (hereinafter, referred to as a bending operation) are input into the operating part 22. The treatment tool for an endoscope 20 further comprises a transmitting part 27 that transmits the operations of the operating part 22 to the grip part 24 and the bendable part 25. The transmitting part 27 has a transmitting member 28 extending from the operating part 22 toward the insertion part 21, and the transmitting member 28 is accommodated inside the soft portion 26. The closing operation and the bending operation, which are input into the operating part 22, are transmitted to the grip part 24 and the bendable part 25 via the transmitting member 28.

Figure 3:
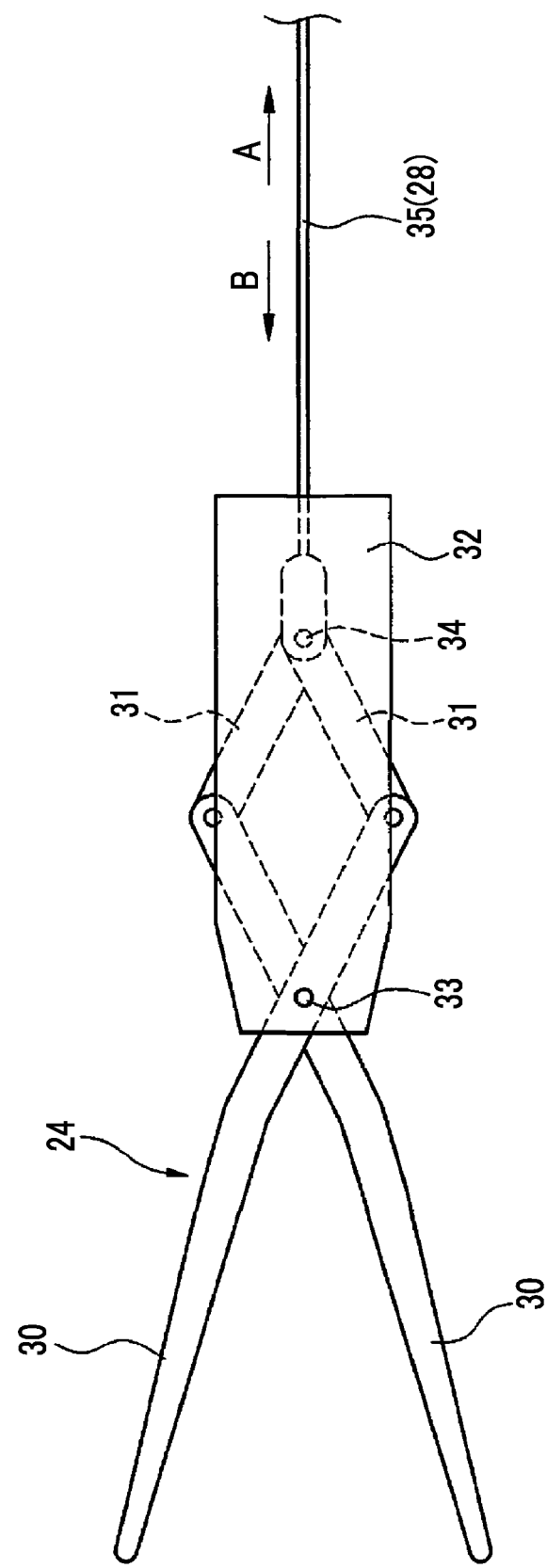
FIG. 3 is a view showing a grip part of the treatment tool for an endoscope of FIG. 2.
Figure 4:
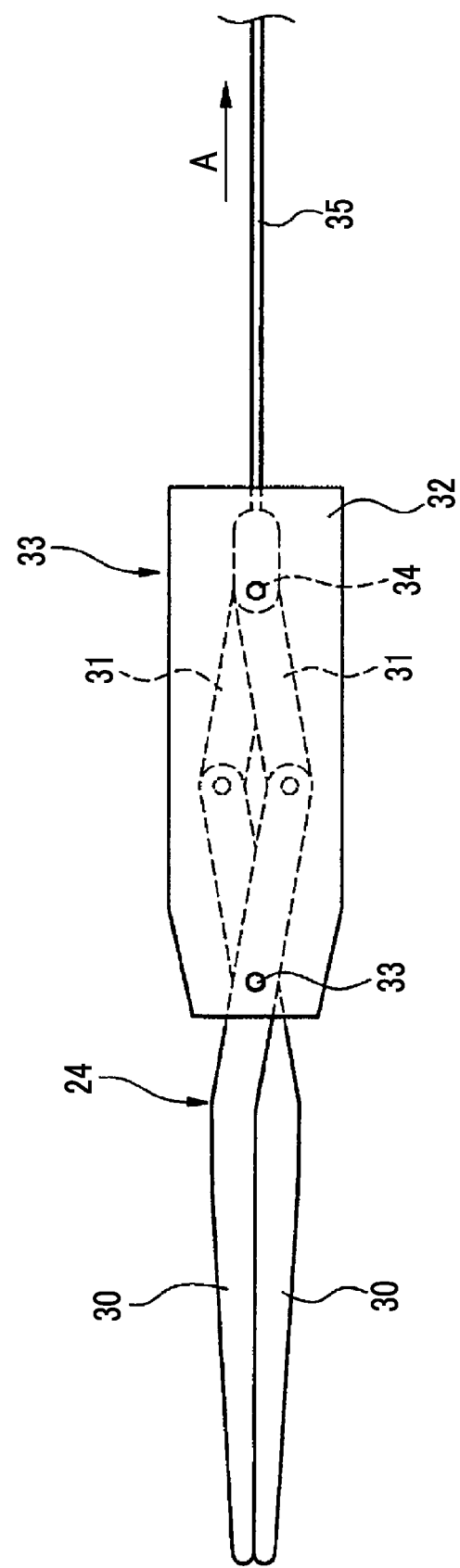
FIG. 4 is a view showing an operation of the grip part of FIG. 3.

FIGS. 3 and 4 show the grip part 24.

The grip part 24 has a pair of grip claws 30, a pair of link members 31, and a support 32 that supports the pair of grip claws 30 so as to be movable rotationally. The pair of grip claws 30 are disposed to intersect each other, and a pin 33 is provided to penetrate an intersecting portion of the pair of grip claws 30. The pair of grip claws 30 are movable rotationally about the pin 33 which is a rotational movement shaft, and the pin 33 is fixed to the support 32.

A distal end part of each of the pair of link members 31 is connected to a proximal end part of each of the pair of grip claws 30 so as to be movable rotationally. A proximal end part of each of the pair of link members 31 is disposed to intersect each other, and a pin 34 is provided to penetrate an intersecting portion of the pair of link members 31. The pair of link members 31 are movable rotationally about the pin 34 which is a rotational movement shaft, and the pin 34 is movable to increase or decrease a distance to the pin 33 instead of being fixed to the support 32.

A wire 35 is connected to the pin 34, a closing operation of the operating part 22 transmitted by the transmitting member 28 is input into the wire 35, and the wire 35 is pulled to an operating part 22 side based on the closing operation of the operating part 22. Herein, as for movement of the wire 35, pulling to the operating part 22 side is defined as a movement in an A-direction, and pushing out to a distal end part 23 side is defined as a movement in a B-direction.

FIG. 3 shows a state where the wire 35 is pushed out to the distal end part 23 side, and the distal end parts of the pair of grip claws 30 are open. By moving the wire 35 in the A-direction (first direction) based on an operation of the operating part 22, the distal end parts of the pair of grip claws 30 are closed as shown in FIG. 4. On the other hand, by moving the wire 35 in the B-direction (second direction) in a state where the distal end parts of the pair of grip claws 30 are closed, the distal end parts of the pair of grip claws 30 are opened.

Figure 5:
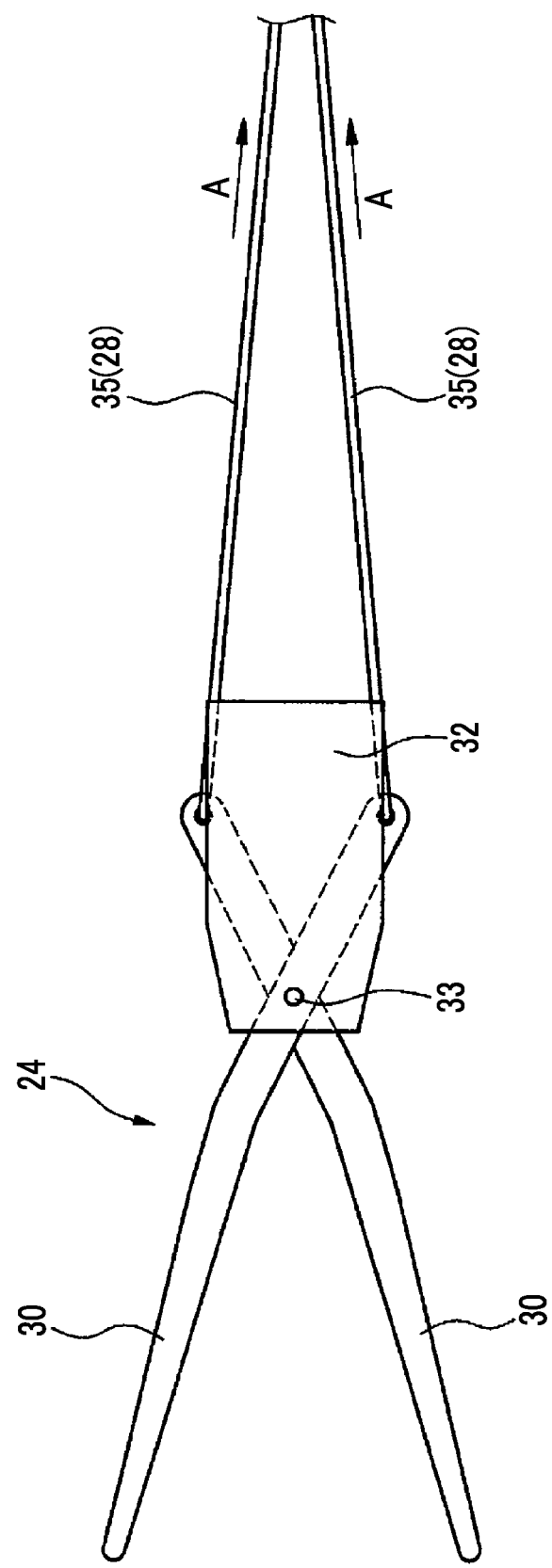
FIG. 5 is a view showing a modification example of the grip part of FIG. 3.

FIG. 5 shows another example of the grip part 24. The wire 35 is connected to the proximal end part of each of the pair of grip claws 30. By moving two wires 35 in the A-direction, the distal end parts of the pair of grip claws 30 are closed. In the example shown in FIG. 5, the pair of link members 31 are unnecessary, and the length of the distal end part 23 can be reduced. Instead of the two wires 35, a single wire of which a distal end side is branched into two may be used.

Figure 6:
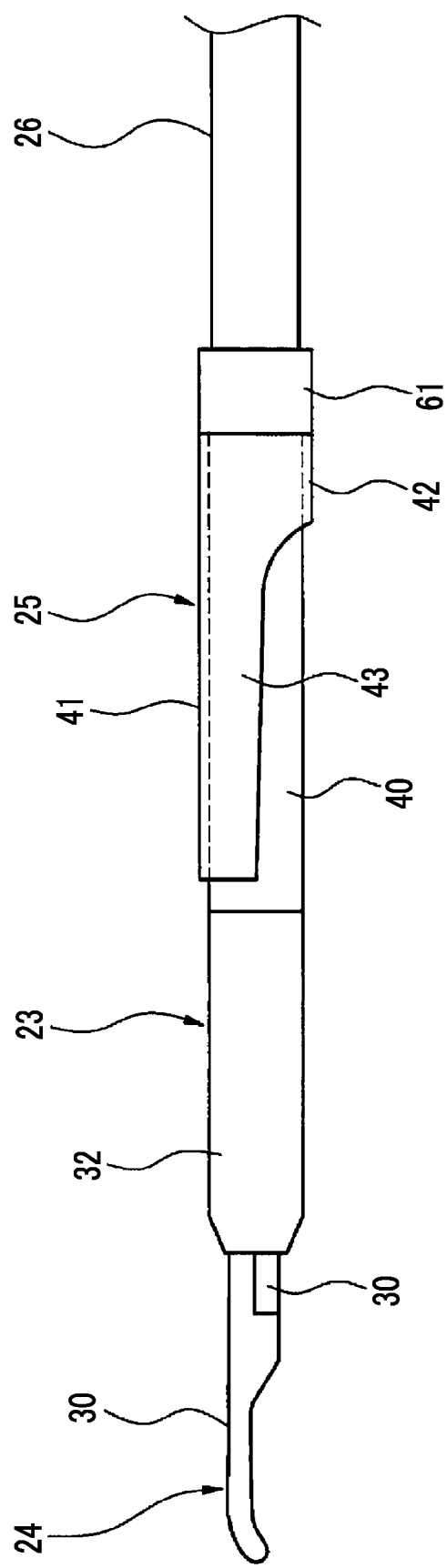
FIG. 6 is a view showing a bendable part of the treatment tool for an endoscope of FIG. 2.
Figure 7:
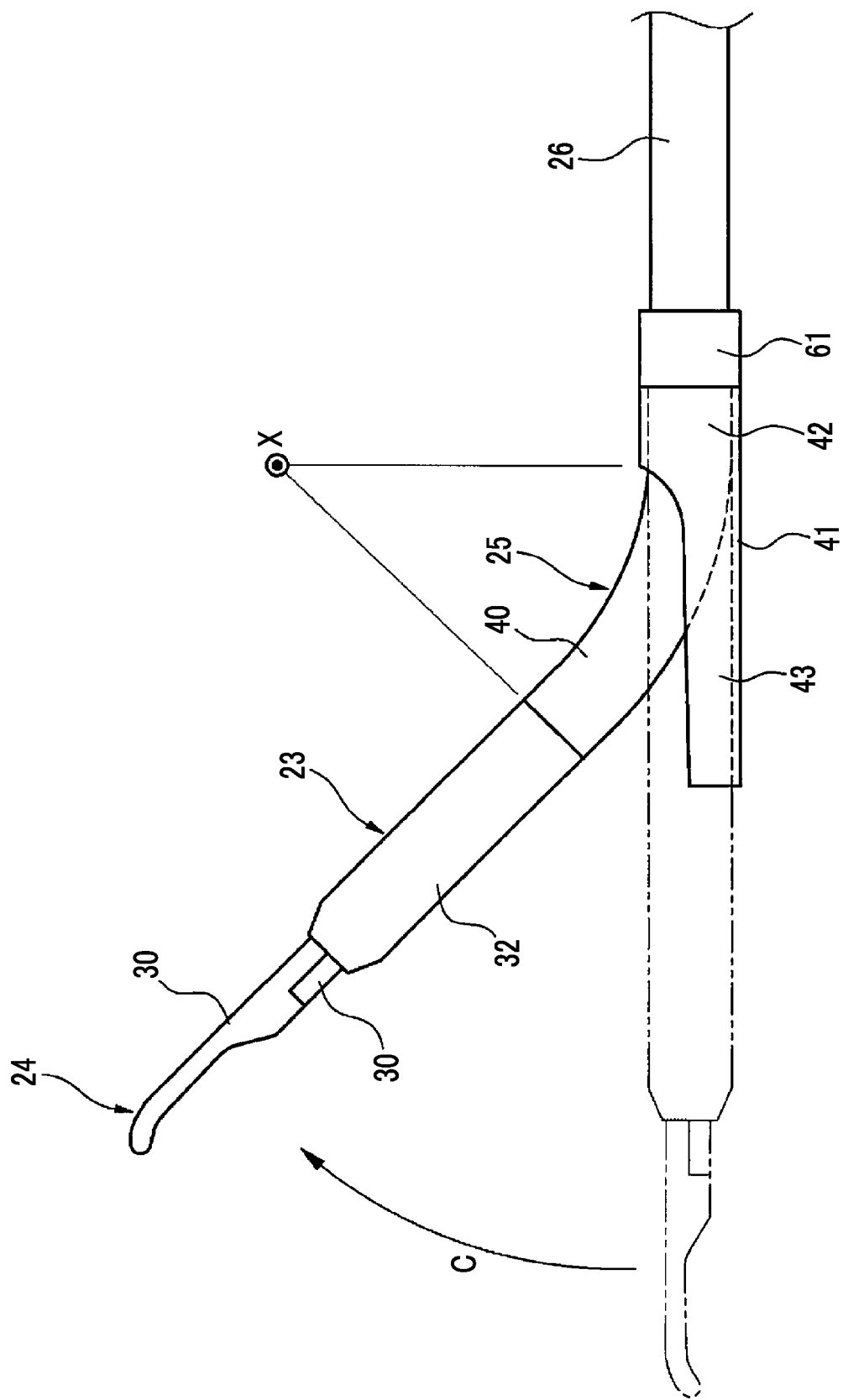
FIG. 7 is a view showing an operation of the bendable part of FIG. 6.

FIGS. 6 and 7 show the bendable part 25.

The bendable part 25 has a tubular member 40 and a restraining member 41. The tubular member 40 is bent in a C-direction about a bending central axis X parallel to an opening and closing direction of the pair of grip claws 30 of the distal end part 23, and is elastically deformable in a linear shape. The restraining member 41 is a linear hard member, and has a proximal end part 42 that is formed in a cylindrical shape and a distal end part 43 that is formed in a semi-cylindrical shape. The proximal end part 42 covers the soft portion 26, and the distal end part 43 covers the bendable part 25. The restraining member 41 is rotatable about a central axis of the insertion part 21.

A bending operation of the operating part 22 transmitted by the transmitting member 28 is transmitted to the restraining member 41, and the restraining member 41 is rotated about the central axis of the insertion part 21 based on a closing operation of the operating part 22. The tubular member 40 is restrained in a linear shape by the restraining member 41 in a state where the restraining member 41 covers a bent inner diameter side in bending of the tubular member 40 in the C-direction. On the other hand, in a state where the restraining member 41 covers a bent outer diameter side in the bending of the tubular member 40 in the C-direction, the tubular member 40 is released from the restraint of the restraining member 41. Accordingly, the tubular member 40 bends due to a restoring force of the tubular member 40, and the bendable part 25 is bent in the C-direction.

Figure 8:
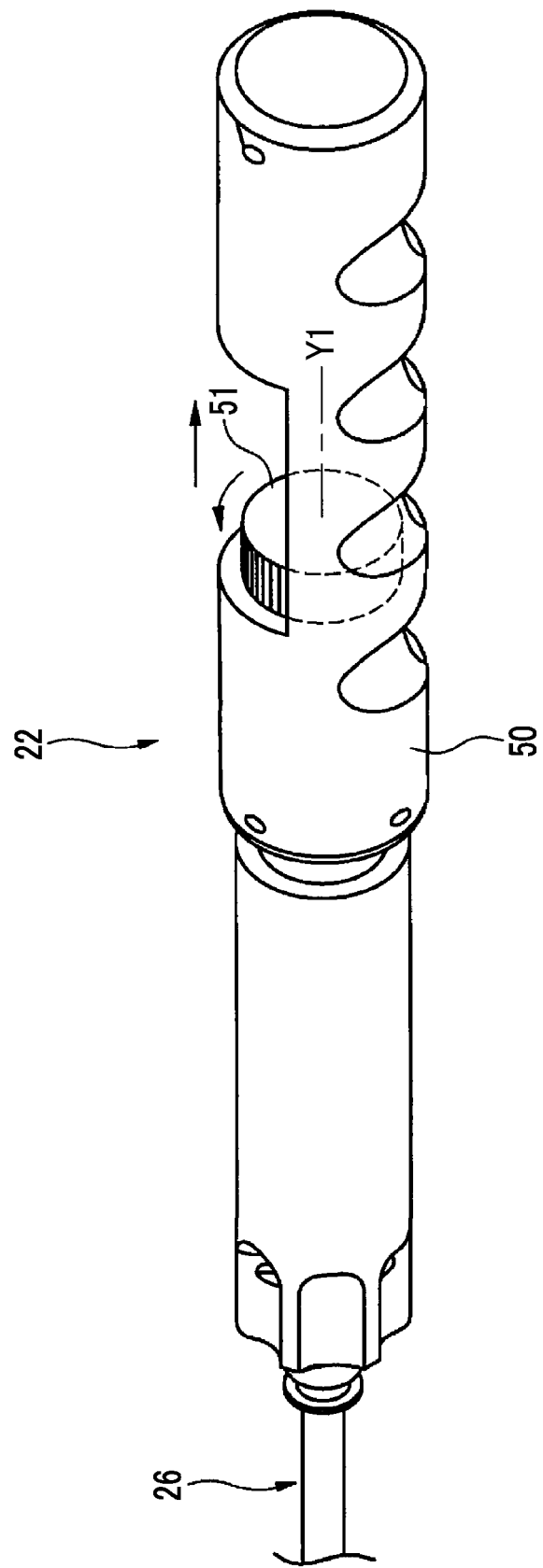
FIG. 8 is a view showing an operating part of the treatment tool for an endoscope of FIG. 2.
Figure 9:
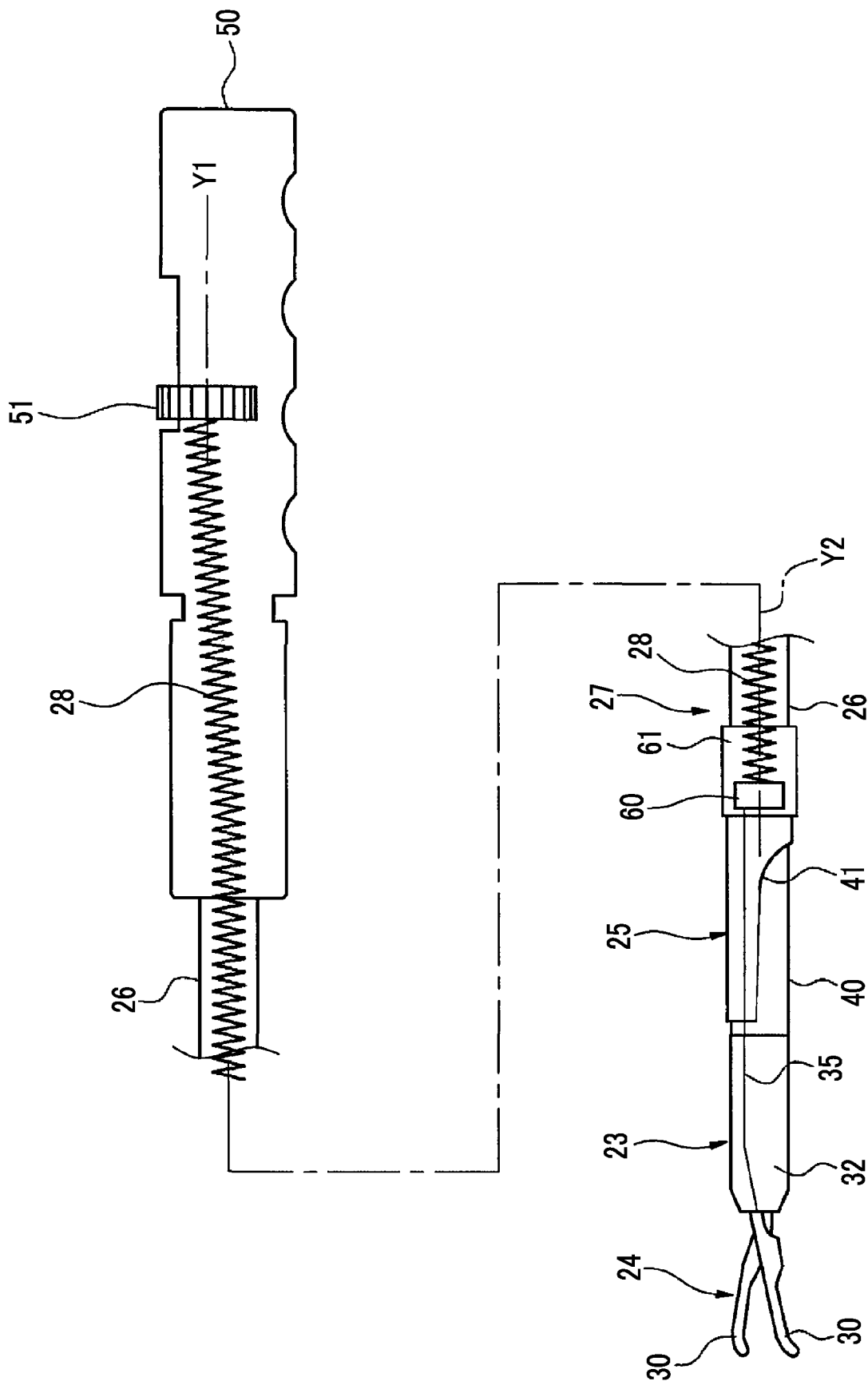
FIG. 9 is a view showing a transmitting part of the treatment tool for an endoscope of FIG. 2.
Figure 10:
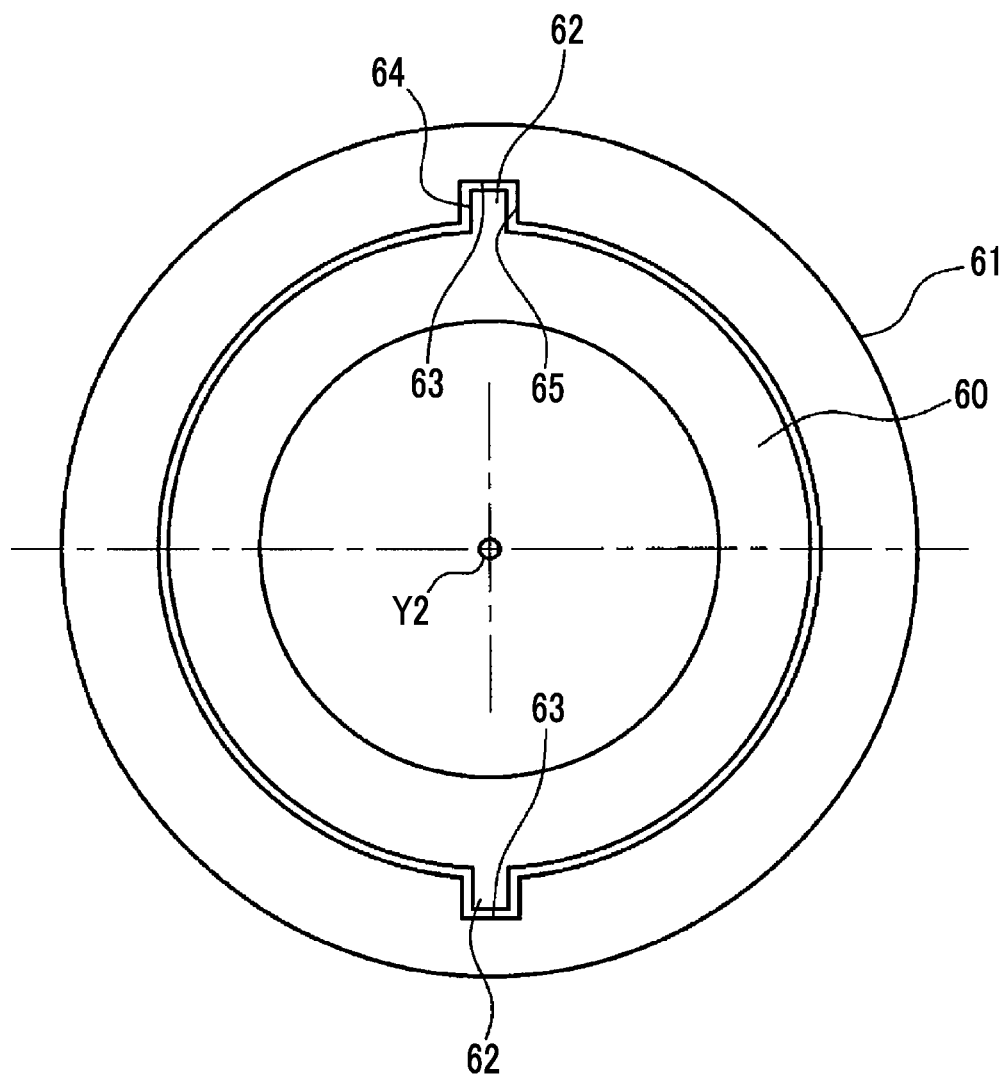
FIG. 10 is a view showing a first member and a second member of the transmitting part of FIG. 9.

FIG. 8 shows the operating part 22.

The operating part 22 has an operating part body 50 and an operating member 51. The operating part body 50 is formed in a cylindrical shape, and the soft portion 26 is connected to a distal end part of the operating part body 50 on one side in the axial direction. A central axis of the operating part body 50 is disposed on an extension of the central axis of the insertion part 21 or is disposed parallel to the central axis of the insertion part 21. The operating member 51 is rotatable about a first rotation axis Y1 which is the same as or is parallel to the central axis of the operating part body 50, and is translatable along the first rotation axis Y1.

FIGS. 9 to 12 show the transmitting part 27.

The transmitting part 27 has the transmitting member 28 and the wire 35 described above, and further has a first member 60 and a second member 61, which are disposed on a distal end side of the soft portion 26. The first member 60 is formed in an annular shape, is rotatable about a second rotation axis Y2 that matches the central axis of the insertion part 21, and is translatable along the second rotation axis Y2. The second member 61 is also formed in an annular shape, and is externally fitted to the first member 60. The second member 61 is rotatable about the second rotation axis Y2, but a translational movement along the second rotation axis Y2 is restricted.

One end of the transmitting member 28 is connected to the operating member 51, and the other end of the transmitting member 28 is connected to the first member 60. In response to a translational operation of the operating member 51, the first member 60 is moved along the second rotation axis Y2, and in response to a rotational operation of the operating member 51, the first member 60 is rotated about the second rotation axis Y2. The transmitting member 28 may be an object that has flexibility, which does not hinder the deformation of the soft portion 26, and can transmit the translation and the rotation, and may be, for example, a coil spring. In addition, the wire 35 is connected to the first member 60 through the bendable part 25, and the restraining member 41 of the bendable part 25 is connected to the second member 61.

The first member 60 has an engaging part 62 on an outer peripheral surface thereof, and the second member 61 has an engaging part 63 that engages with the engaging part 62 in an inner peripheral surface thereof. The engaging part 62 and the engaging part 63 extend in an axial direction of the second rotation axis Y2. The engaging part 62 is formed in a convex shape in a cross section perpendicular to the axial direction, the engaging part 63 is formed in a concave shape in a cross section perpendicular to the axial direction, and the engaging part 62 and the engaging part 63 are fitted to each other. A side surface 64 of the engaging part 62 and a side surface 65 of the engaging part 63 extend in the axial direction of the second rotation axis Y2 and intersect a circumferential direction about the second rotation axis Y2. The engaging part 62 may be formed in a concave shape, and the engaging part 63 may be formed in a convex shape.

Based on the engagement between the side surface 64 of the engaging part 62 and the side surface 65 of the engaging part 63, a relative movement between the first member 60 and the second member 61 along the second rotation axis Y2 is allowed, and a relative rotation about the second rotation axis Y2 is prevented. In response to a translational operation of the operating member 51, the side surface (engaging surface) 64 of the engaging part 62 and the side surface (engaging surface) 65 of the engaging part 63 slide in the axial direction of the second rotation axis Y2, and the first member 60 is independently moved along the second rotation axis Y2. On the other hand, in response to a rotational operation of the operating member 51, the side surface (engaging surface) 64 of the engaging part 62 and the side surface (engaging surface) 65 of the engaging part 63 abut against each other in the circumferential direction about the second rotation axis Y2, and the first member 60 and the second member 61 are integrally rotated about the second rotation axis Y2.

Figure 11:
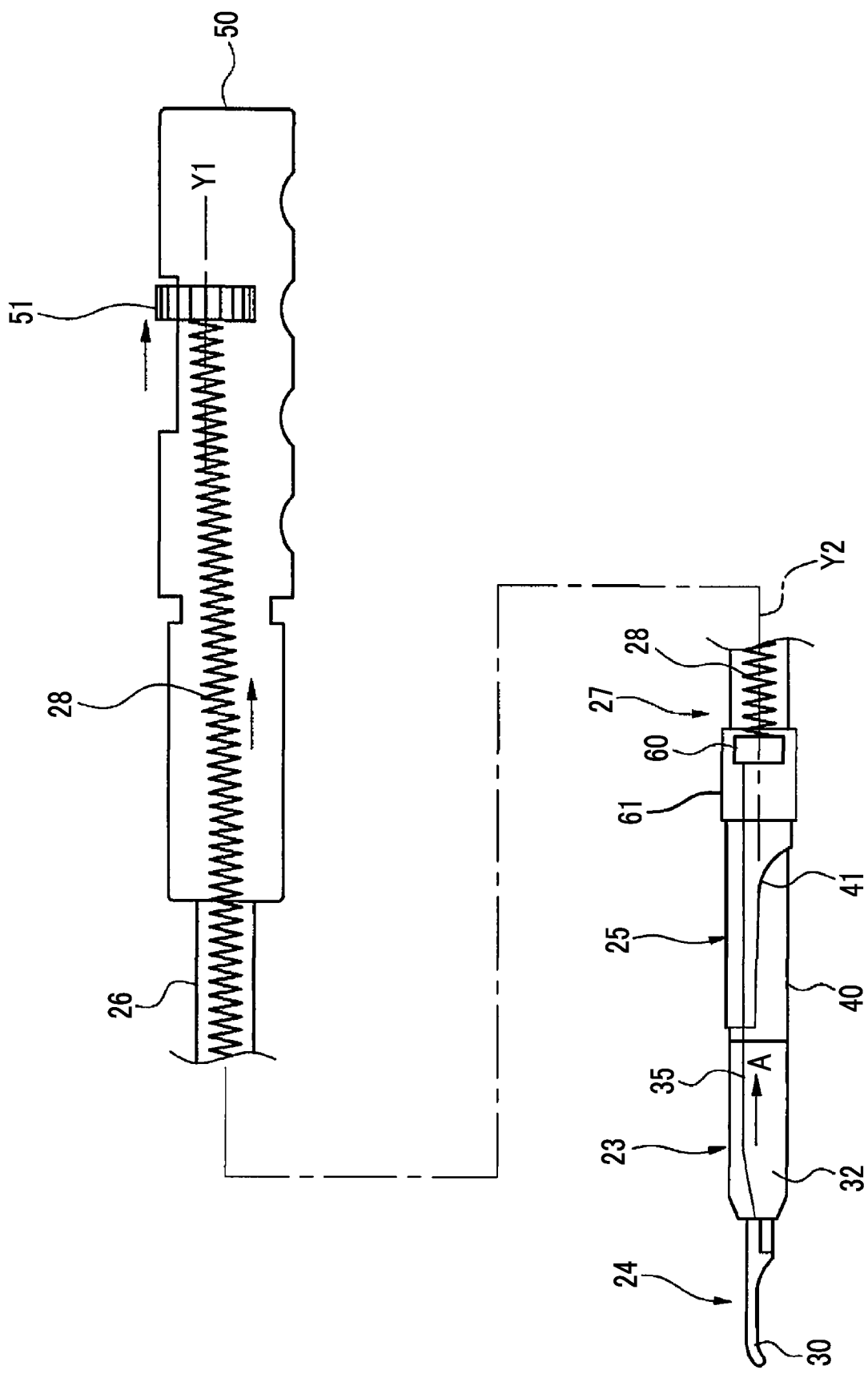
FIG. 11 is a view showing an operation of the transmitting part of FIG. 9.

As shown in FIG. 11, in response to a translational operation of the operating member 51, the first member 60 is moved to the operating part 22 side along the second rotation axis Y2. Accordingly, the wires 35 is moved in the A-direction, and the grip part 24 is closed. In response to the translational operation of the operating member 51, the second member 61 is not rotated about the second rotation axis Y2, the restraining member 41 is maintained in a state of covering the bent inner diameter side in the bending of the tubular member 40 in the C-direction, and the tubular member 40 is restrained in a linear shape.

Figure 12:
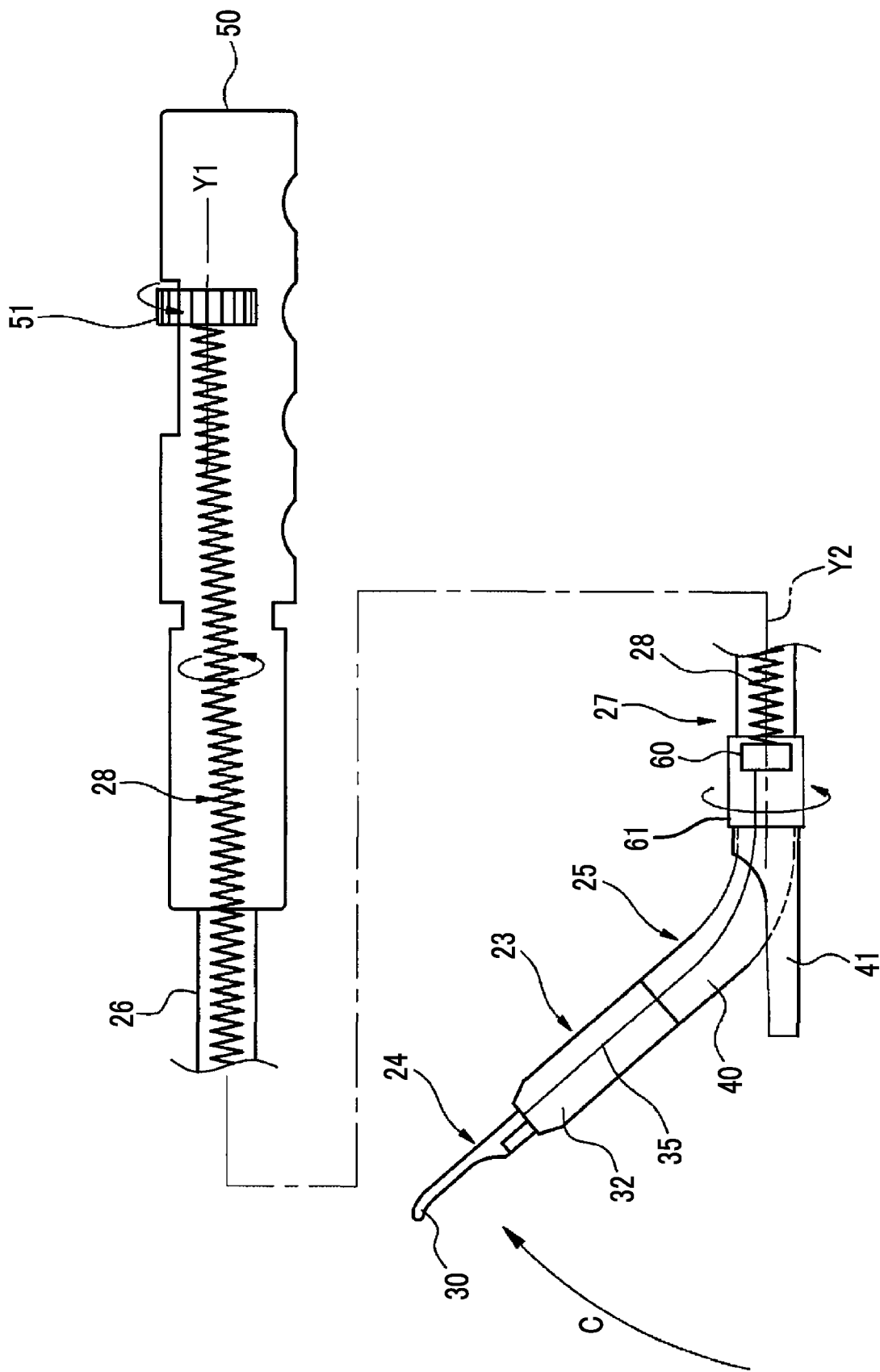
FIG. 12 is a view showing the operation of the transmitting part of FIG. 9.

Next, as shown in FIG. 12, in response to a rotational operation of the operating member 51, the first member 60 and the second member 61 are integrally rotated about the second rotation axis Y2. With the rotation of the second member 61, the restraining member 41 covers the bent outer diameter side in the bending of the tubular member 40 in the C-direction, and the tubular member 40 is released from the restraint of the restraining member 41. Accordingly, the tubular member 40 bends due to a restoring force of the tubular member 40, and the bendable part 25 is bent in the C-direction. In response to the rotational operation of the operating member 51, the first member 60 is not moved along the second rotation axis Y2, and the grip part 24 is maintained in a closed state.

Figure 13:
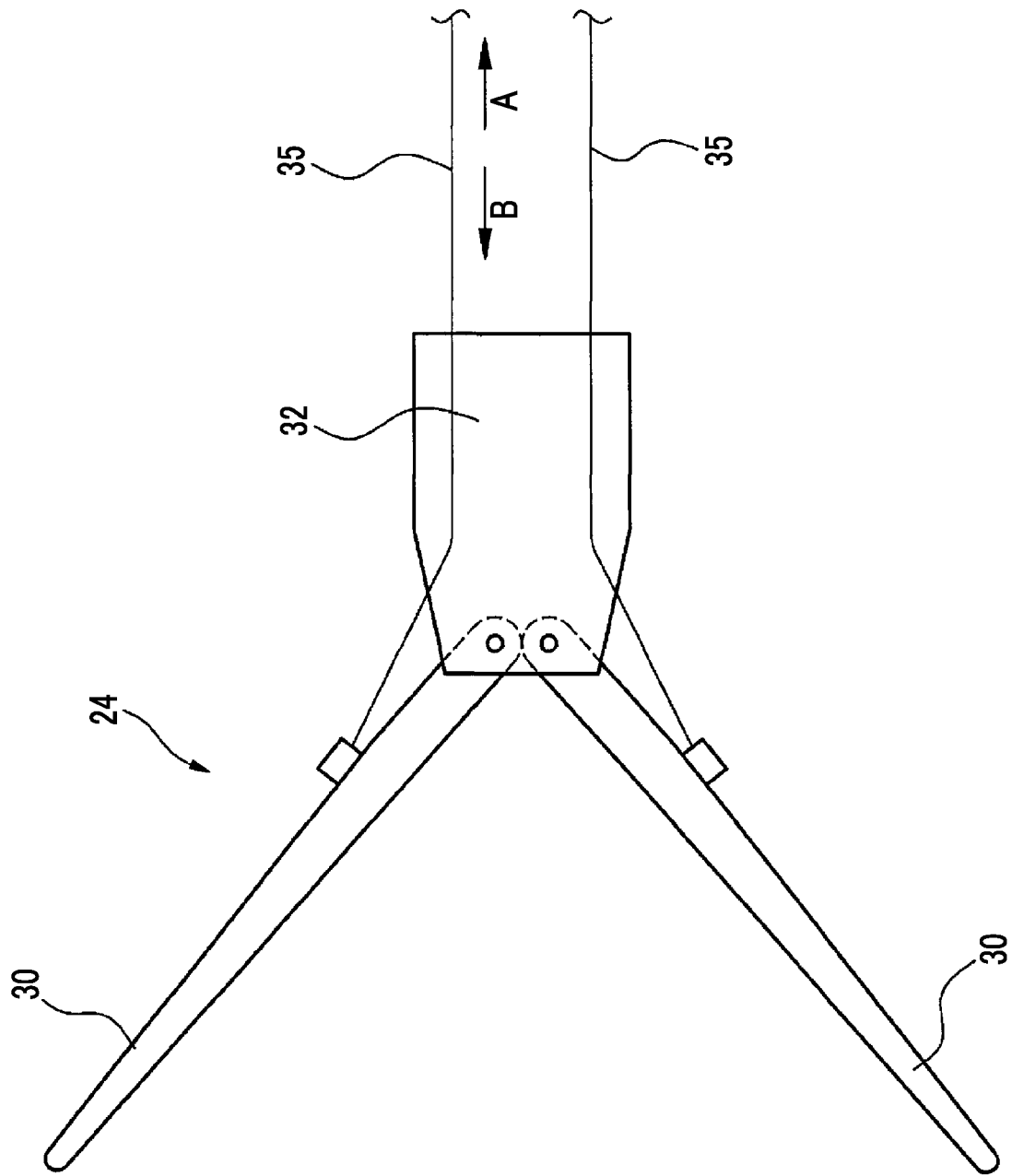
FIG. 13 is a view showing a modification example of the grip part of FIG. 3.
Figure 14:
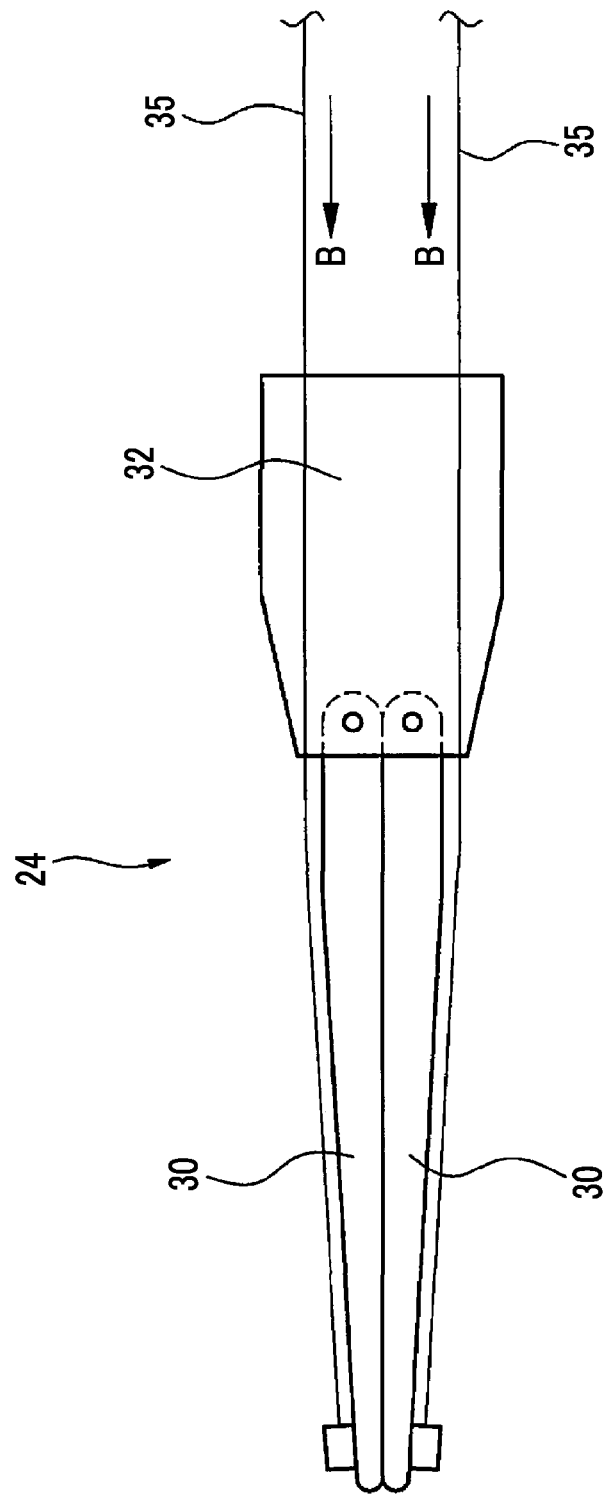
FIG. 14 is a view showing an operation of the grip part of FIG. 13.

In response to a translational operation of the operating member 51, the first member 60 may be moved to the distal end part 23 side along the second rotation axis Y2, and accordingly the grip part 24 may be closed. In an example shown in FIGS. 13 and 14, the two wires 35 are connected to the grip claws 30 so as to be movable in a longitudinal direction of the grip claws 30. FIG. 13 shows a state where the wires 35 are pulled to the operating part 22 side, and the distal end parts of the pair of grip claws 30 are open. In response to the translational operation of the operating member 51, the first member 60 is pushed out to the distal end part 23 side along the second rotation axis Y2, and the wires 35 are moved in the B-direction. Accordingly, as shown in FIG. 14, the distal end parts of the pair of grip claws 30 are closed.

FIGS. 15 to 18 show a treatment method for ESD as an example of a treatment method using the treatment tool for an endoscope 20.

Figure 15:
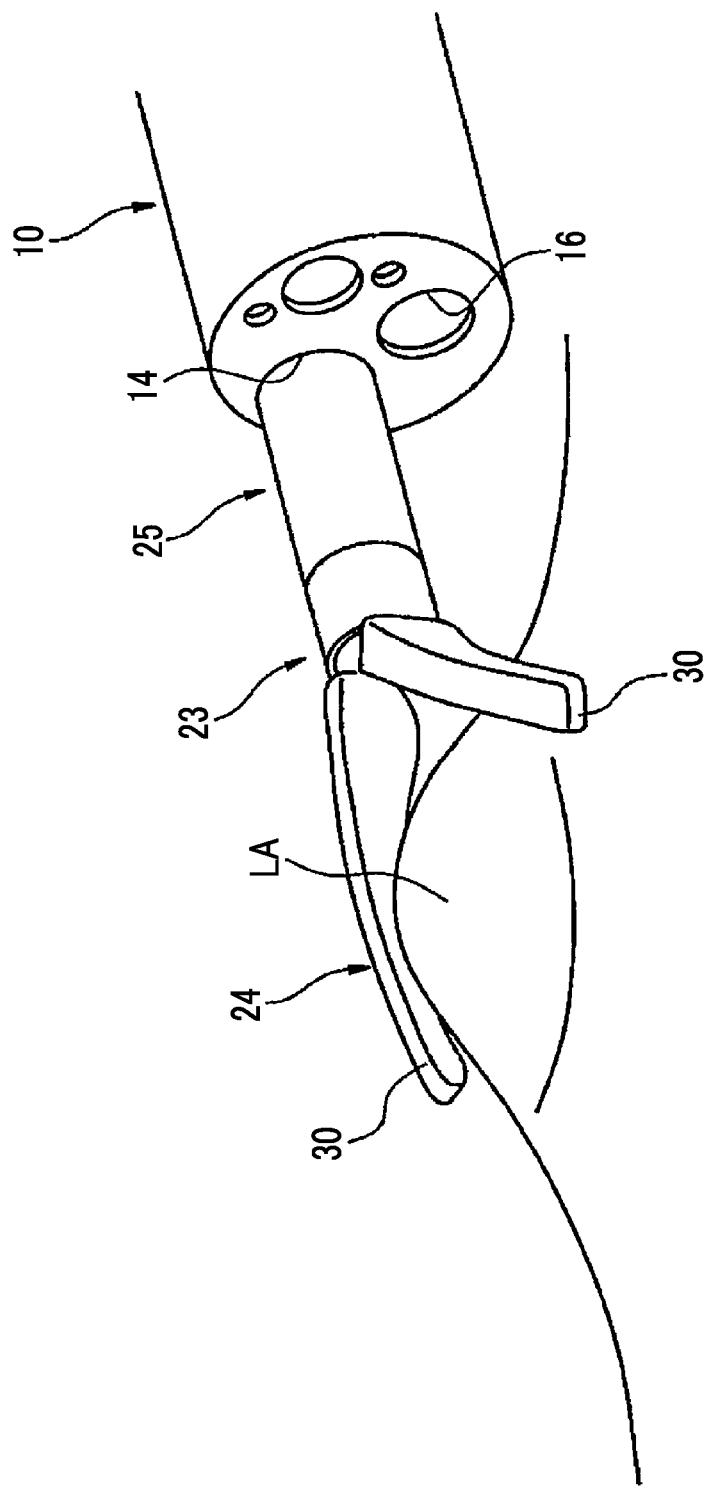
FIG. 15 is a view showing an example of a treatment method using a combination of the treatment tool for an endoscope of FIG. 2 and another endoscope treatment tool.

The endoscope 2 is inserted into the body, and the endoscope distal end part 10 is disposed at the side of a lesion part LA of a mucous membrane layer. The treatment tool for an endoscope 20 is inserted into the first treatment tool channel 14 of the endoscope 2, and the distal end part 23 and the bendable part 25 of the treatment tool for an endoscope 20 protrude from the edge surface of the endoscope distal end part 10 as shown in FIG. 15.

Figure 16:
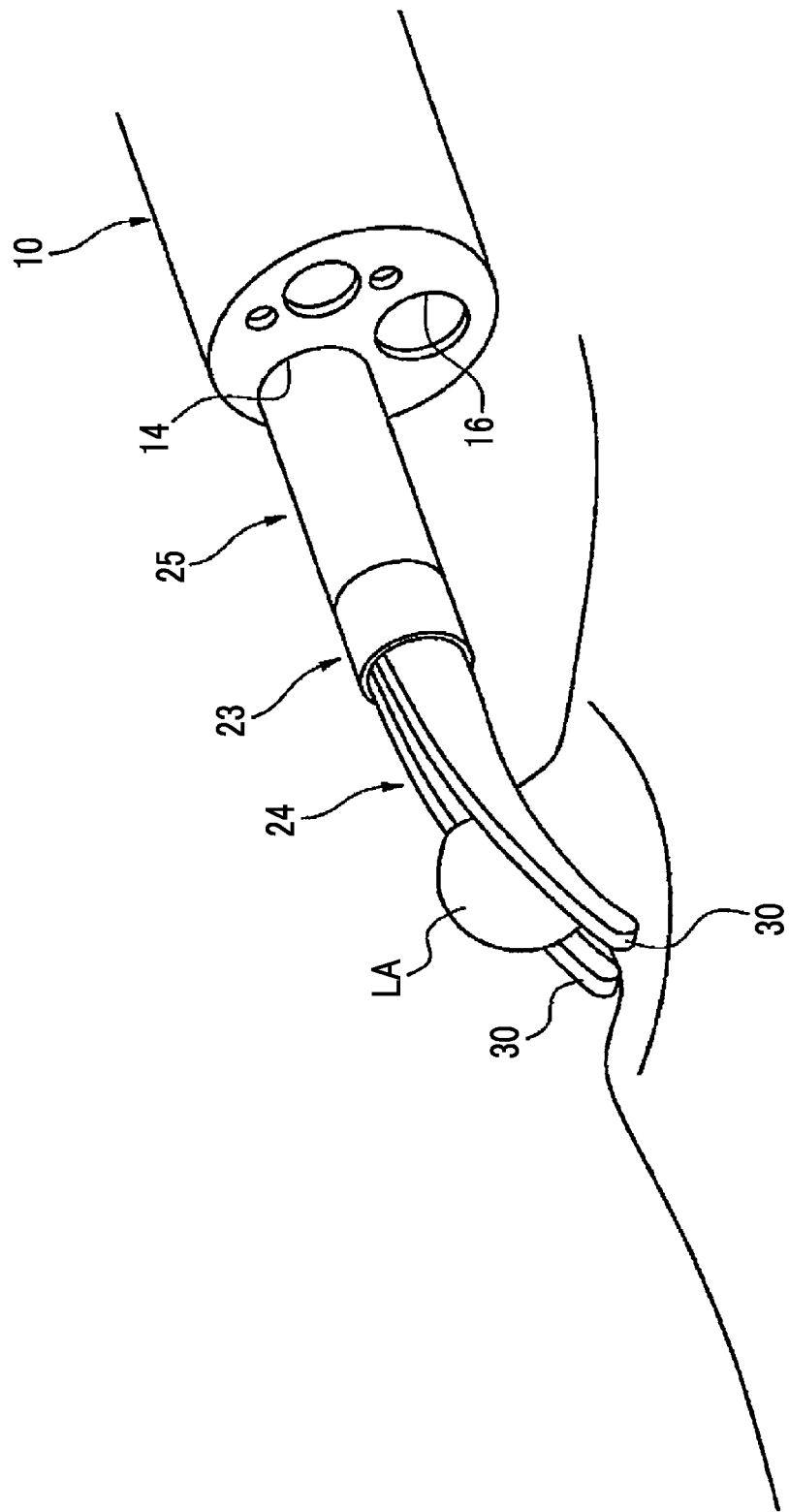
FIG. 16 is a view showing an example of the treatment method using the combination of the treatment tool for an endoscope of FIG. 2 and the other endoscope treatment tool.
Figure 17:
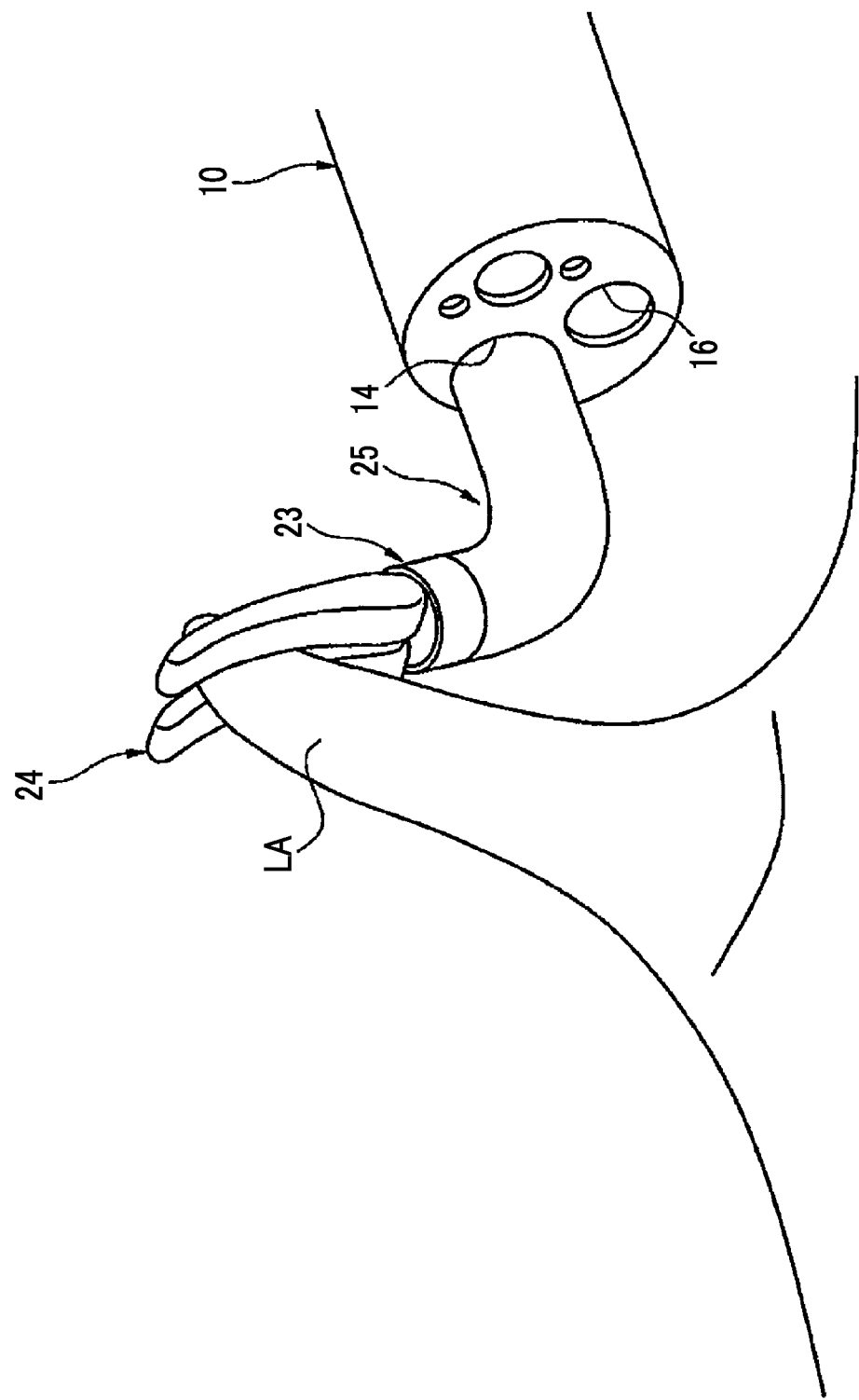
FIG. 17 is a view showing an example of the treatment method using the combination of the treatment tool for an endoscope of FIG. 2 and the other endoscope treatment tool.

Next, as shown in FIG. 16, the grip part 24 is closed based on an operation of the operating part 22, and the lesion part LA is gripped by the grip part 24. Then, after the lesion part LA is gripped by the grip part 24, the bendable part 25 is bent based on an operation of the operating part 22 as shown in FIG. 17. Accordingly, the grip part 24 is erected, and the lesion part LA gripped by the grip part 24 is lifted.

Figure 18:
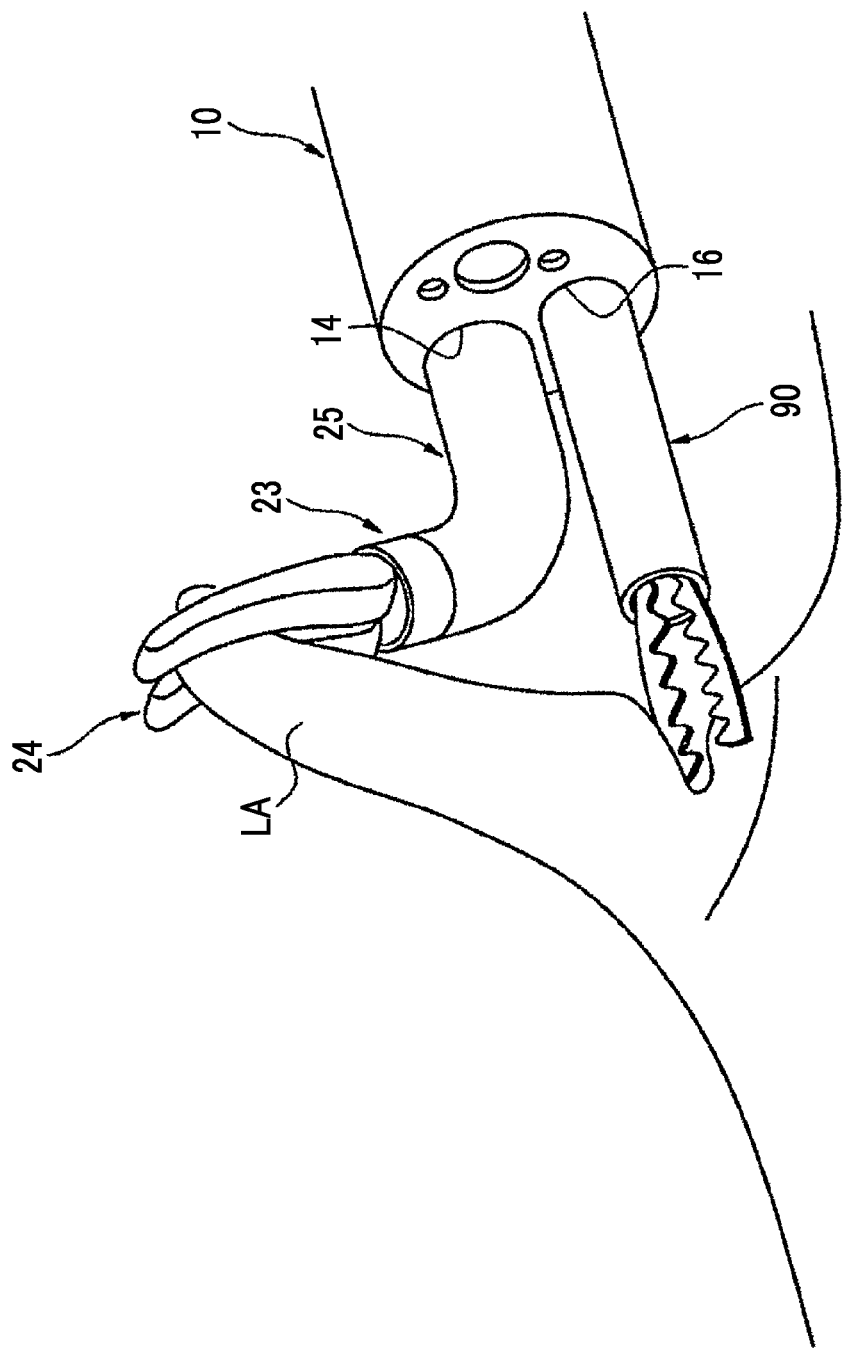
FIG. 18 is a view showing an example of the treatment method using the combination of the treatment tool for an endoscope of FIG. 2 and the other endoscope treatment tool.

In a state where the lesion part LA is being lifted, a high-frequency forcep 90 is inserted into the second treatment tool channel 16 of the endoscope 2, and the high-frequency forcep 90 protrudes from the edge surface of the endoscope distal end part 10 as shown in FIG. 18. Then, a lower part of the lesion part LA is incised by the high-frequency forcep 90.

The other endoscope treatment tool used in combination with the treatment tool for an endoscope 20 is selected as appropriate according to treatment, and is not limited to the high-frequency forcep 90. Examples of the other endoscope treatment tool include incision tools, such as high-frequency forceps and high-frequency knives, hemostatic tools, such as bipolar hemostatic forceps and clips, injection needles, and collection nets.

In the treatment method described above, the gripping of the lesion part LA by closing the grip part 24 and the lifting of the lesion part LA by bending the bendable part 25 are performed only with an operation of the operating member 51 of the operating part 22 as described above. A closing operation of closing the grip part 24 and a bending operation of bending the bendable part 25 are independent of each other, and in a case where the grip part 24 is closed, the bendable part 25 is maintained in a linear shape, and a relative movement between the grip part 24 and the lesion part LA is prevented. Accordingly, the gripping of the lesion part LA and the lifting of the gripped lesion part LA can be easily performed with an operation of the treatment tool for an endoscope 20 alone.

Figure 19:
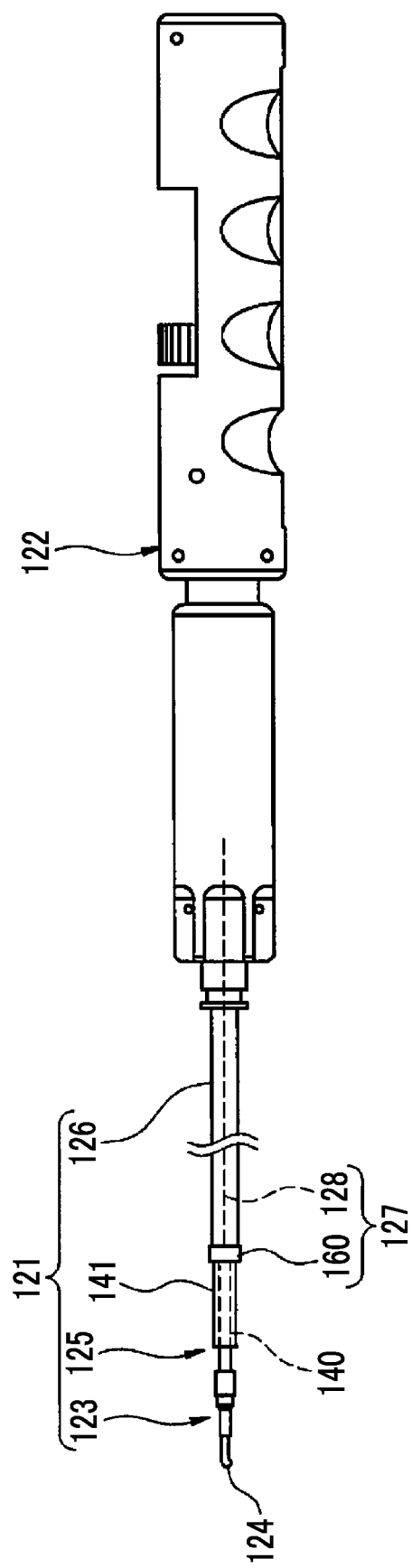
FIG. 19 is a view showing another example of the treatment tool for an endoscope, which is for describing Embodiment 1 of the present invention.

FIG. 19 shows another example of the treatment tool for an endoscope, which is for describing Embodiment 1 of the present invention.

A treatment tool for an endoscope 120 shown in FIG. 19 comprises an insertion part 121 and an operating part 122. The insertion part 121 has a distal end part 123 at which an openable and closable grip part 124 is provided, a bendable part 125, and a soft portion 126. A closing operation of closing the grip part 124 and a bending operation of bending the bendable part 125 are input into the operating part 122. The treatment tool for an endoscope 120 further comprises a transmitting part 127 that transmits the operations of the operating part 122 to the grip part 124 and the bendable part 125. The transmitting part 127 has a transmitting member 128 extending from the operating part 122 toward the insertion part 121, and the closing operation and the bending operation input into the operating part 122 are transmitted to the grip part 124 and the bendable part 125 via the transmitting member 128.

Figure 20:
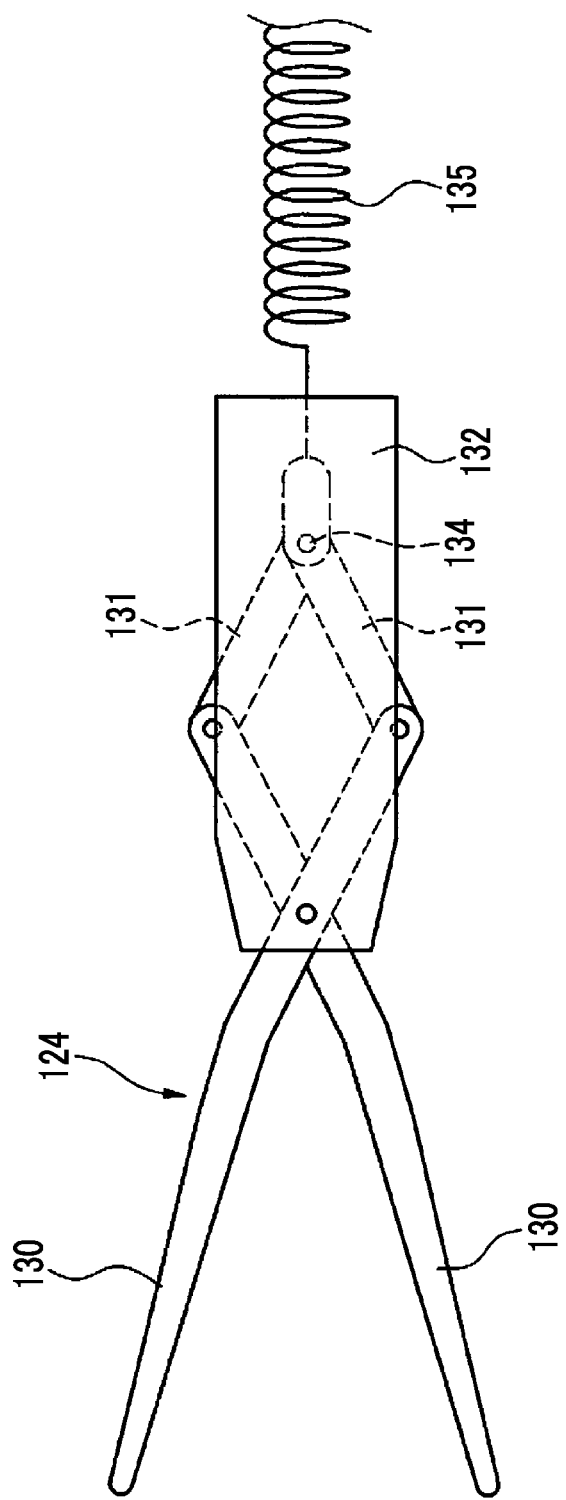
FIG. 20 is a view showing the grip part of the treatment tool for an endoscope of FIG. 19.

FIG. 20 shows the grip part 124.

Similar to the grip part 24 shown in FIGS. 3 and 4, the grip part 124 has a pair of grip claws 130, a pair of link members 131, and a support 132 that supports the pair of grip claws 130 so as to be movable rotationally. A coil spring 135 is connected to a pin 134 that connects proximal end parts of the pair of link members 131 to each other so as to be movable rotationally, and a closing operation of the operating part 122 transmitted by the transmitting member 128 is input into the coil spring 135. The coil spring 135 is twisted based on the closing operation of the operating part 122, and distal end parts of the pair of grip claws 130 are closed by contracting in response to the twist.

Figure 21:
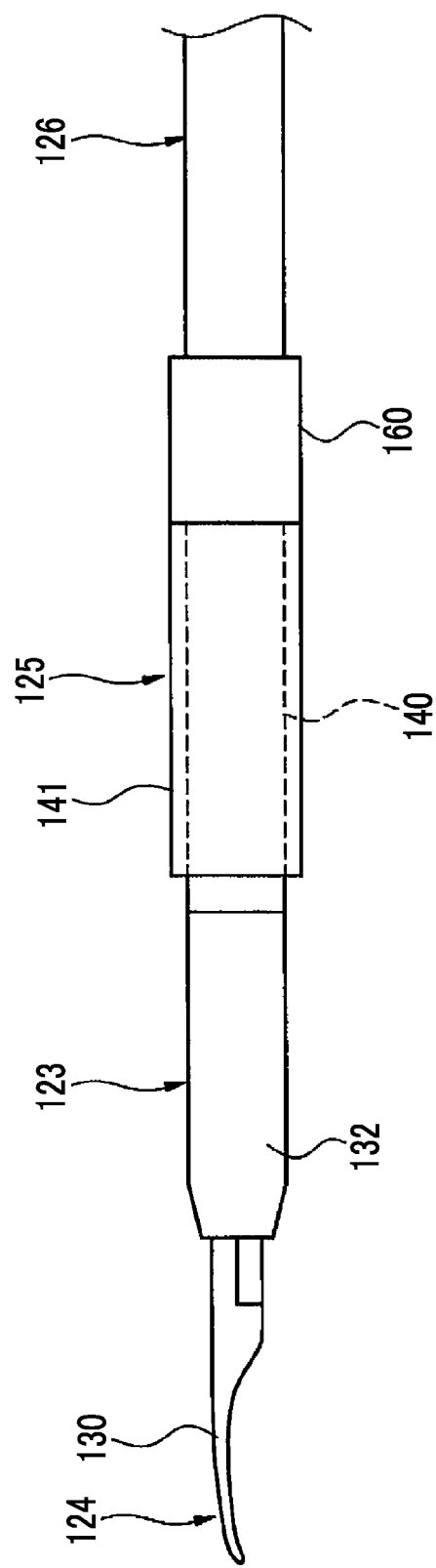
FIG. 21 is a view showing the bendable part of the treatment tool for an endoscope of FIG. 19.
Figure 22:
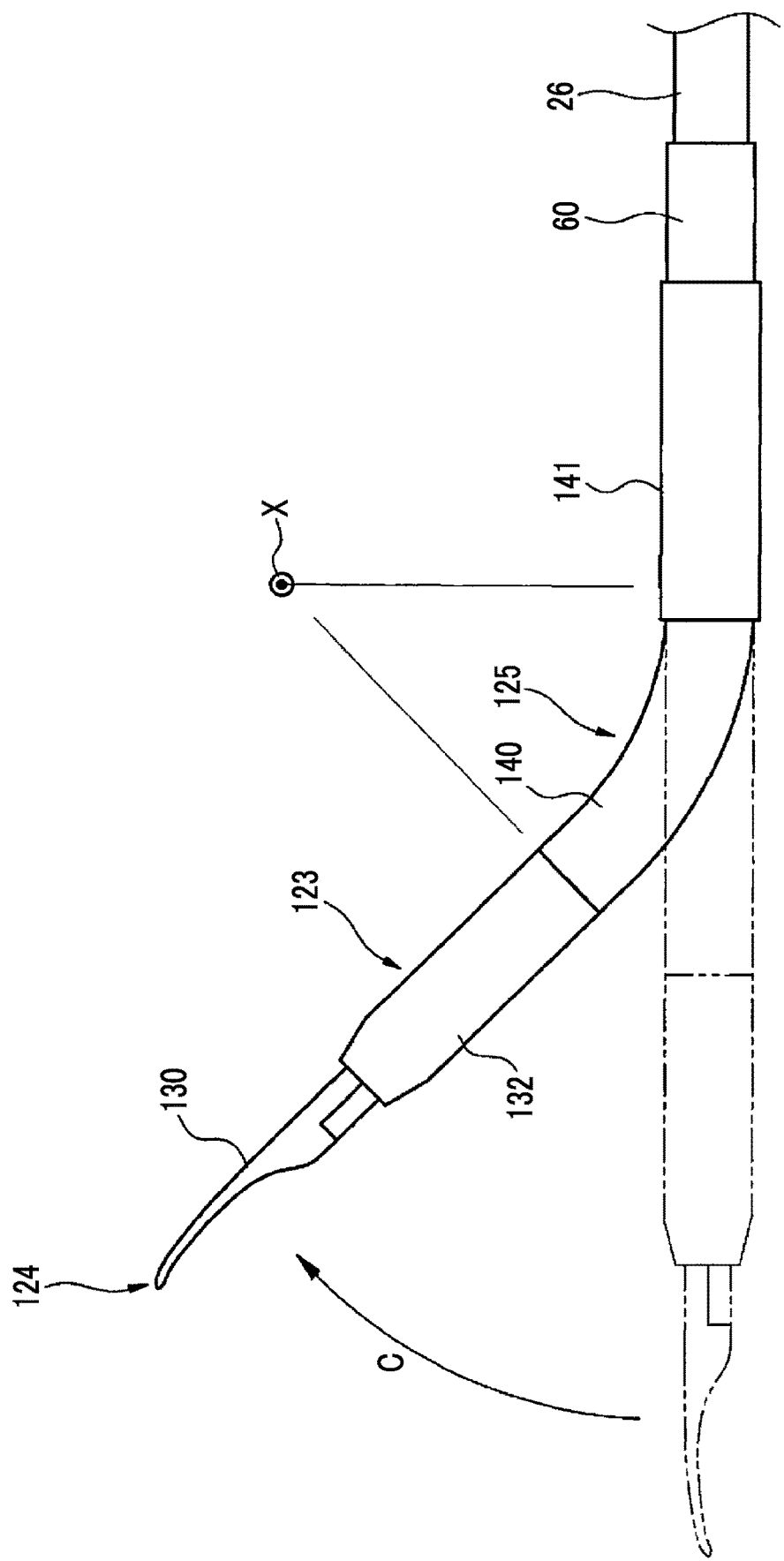
FIG. 22 is a view showing an operation of the bendable part of FIG. 21.
Figure 23:
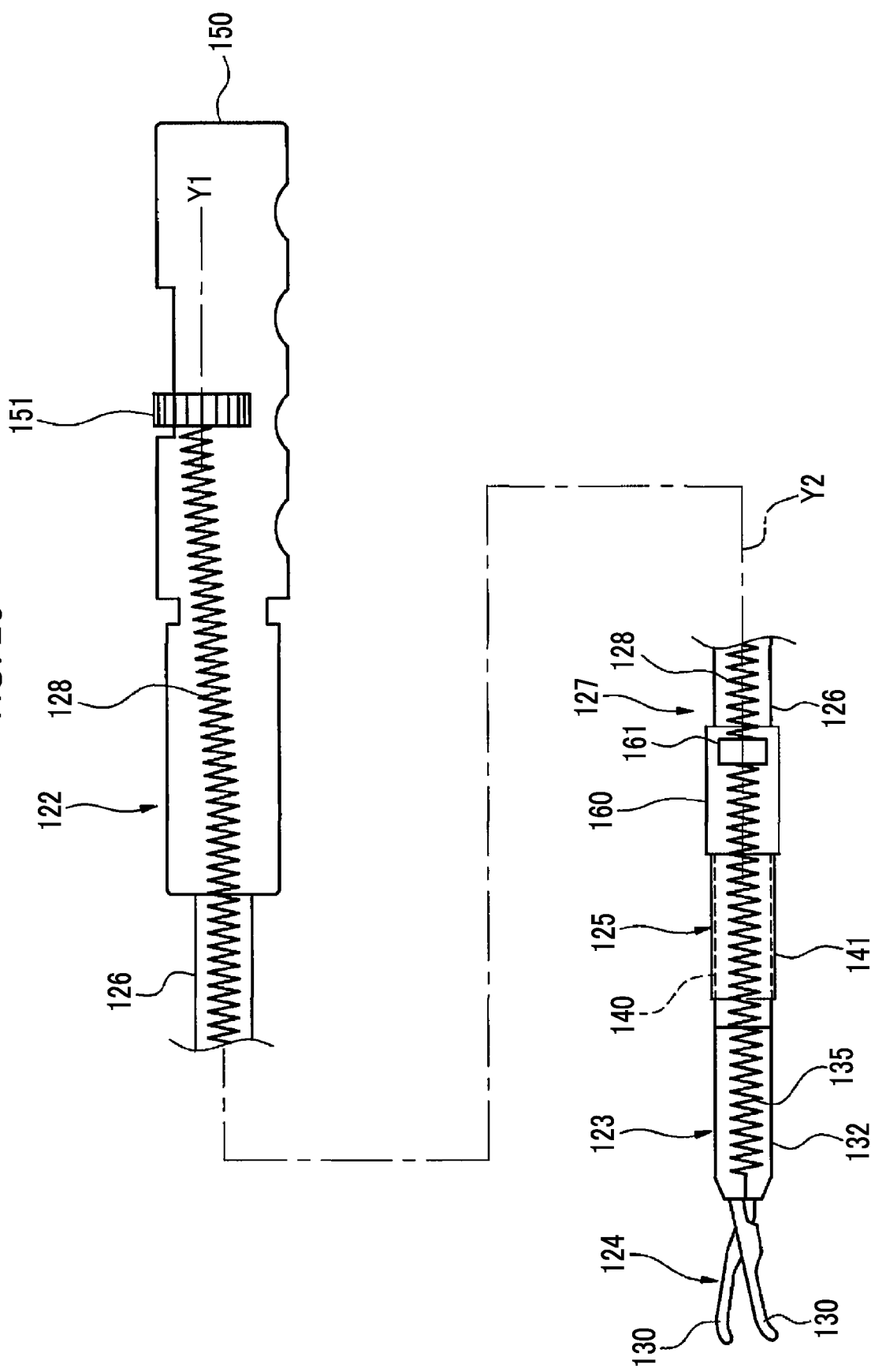
FIG. 23 is a view showing the operating part and the transmitting part of the treatment tool for an endoscope of FIG. 19.
Figure 24:
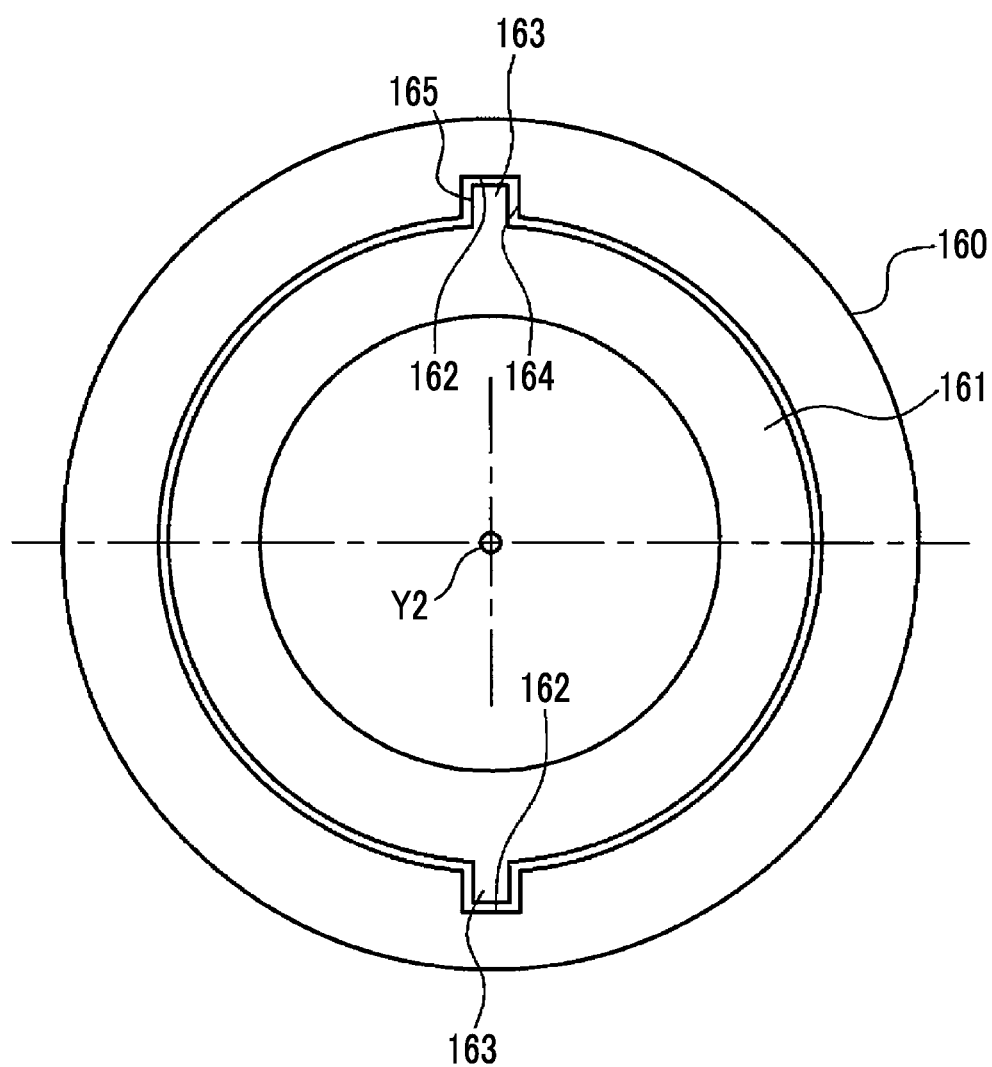
FIG. 24 is a view showing the first member and the second member of the transmitting part of FIG. 23.

FIGS. 21 and 22 show the bendable part 125.

The bendable part 125 has a tubular member 140 and a restraining member 141. The tubular member 140 is bent in the C-direction about the bending central axis X parallel to an opening and closing direction of the pair of grip claws 130 of the grip part 124, and is elastically deformable in a linear shape. The restraining member 141 is a linear hard member, and is formed in a cylindrical shape that can accommodate the tubular member 140. The restraining member 141 covers the tubular member 140 so as to be movable along a central axis of the insertion part 121.

A bending operation of the operating part 122 transmitted by the transmitting member 128 is transmitted to the restraining member 141, and the restraining member 141 is moved along the central axis of the insertion part 121 based on the bending operation of the operating part 122. As shown in FIG. 21, the tubular member 140 is restrained in a linear shape by the restraining member 141 in a state where the restraining member 141 covers the tubular member 140. On the other hand, as shown in FIG. 22, in a case where the restraining member 141 is moved to the soft portion 126, the tubular member 140 is released from the restraint of the restraining member 141. Accordingly, the tubular member 140 bends due to a restoring force of the tubular member 140, and the bendable part 125 is bent in the C-direction.

FIGS. 23 to 26 show the operating part 122 and the transmitting part 127.

The operating part 122 has an operating part body 150 and an operating member 151. The operating part body 150 is formed in a cylindrical shape, and the soft portion 126 is connected to a distal end part of the operating part body 150 on one side in the axial direction. A central axis of the operating part body 150 is disposed on an extension of the central axis of the insertion part 121 or is disposed parallel to the central axis of the insertion part 121. The operating member 151 is rotatable about the first rotation axis Y1 that is the same as or is parallel to the central axis of the operating part body 150, and is translatable along the first rotation axis Y1.

The transmitting part 127 has the transmitting member 128 and the coil spring 135 described above, and further has a first member 160 and a second member 161, which are disposed on a distal end side of the soft portion 126. The first member 160 is formed in an annular shape, is rotatable about the second rotation axis Y2 that matches the central axis of the insertion part 121, and is translatable along the second rotation axis Y2. The second member 161 is also formed in an annular shape, and is internally fitted to the first member 160. The second member 161 is rotatable about the second rotation axis Y2, but a translational movement along the second rotation axis Y2 is restricted.

One end of the transmitting member 128 is connected to the operating member 151, and the other end of the transmitting member 128 is connected to the first member 160. In response to a translational operation of the operating member 151, the first member 160 is moved along the second rotation axis Y2, and in response to a rotational operation of the operating member 151, the first member 160 is rotated about the second rotation axis Y2. The coil spring 135 is connected to the second member 161 through the bendable part 125, and the restraining member 141 of the bendable part 125 is connected to the first member 160.

The first member 160 has an engaging part 162 on an inner peripheral surface thereof, and the second member 161 has an engaging part 163 that engages with the engaging part 162 in an outer peripheral surface thereof. The engaging part 162 and the engaging part 163 extend in the axial direction of the second rotation axis Y2. The engaging part 162 is formed in a concave shape in a cross section perpendicular to the axial direction, the engaging part 163 is formed in a convex shape in a cross section perpendicular to the axial direction, and the engaging part 162 and the engaging part 163 are fitted to each other. A side surface 164 of the engaging part 162 and a side surface 165 of the engaging part 163 extend in the axial direction of the second rotation axis Y2 and intersect the circumferential direction about the second rotation axis Y2. The engaging part 162 may be formed in a convex shape, and the engaging part 163 may be formed in a concave shape.

Based on the engagement between the side surface 164 of the engaging part 162 and the side surface 165 of the engaging part 163, a relative movement between the first member 160 and the second member 161 along the second rotation axis Y2 is allowed, and a relative rotation about the second rotation axis Y2 is prevented. In response to a translational operation of the operating member 151, the first member 160 is independently moved along the second rotation axis Y2. On the other hand, in response to a rotational operation of the operating member 151, the first member 160 and the second member 161 are integrally rotated about the second rotation axis Y2.

Figure 25:
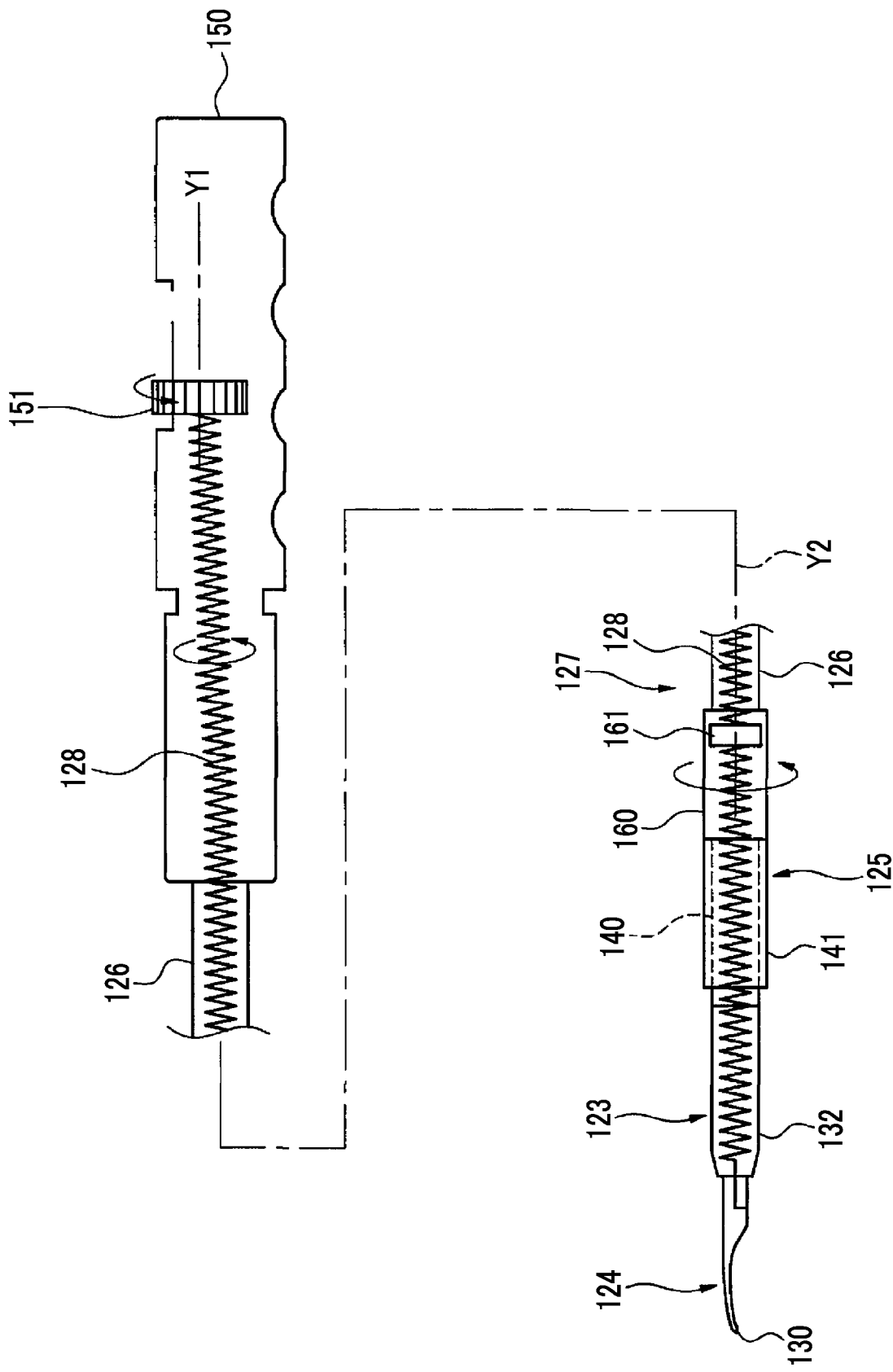
FIG. 25 is a view showing an operation of the transmitting part of FIG. 23.

As shown in FIG. 25, in response to a rotational operation of the operating member 151, the first member 160 and the second member 161 are rotated about the second rotation axis Y2. As the coil spring 135 connected to the second member 161 is twisted and the coil spring 135 contracts, the grip part 24 is closed. In response to the rotational operation of the operating member 151, the first member 160 is not moved along the second rotation axis Y2, the restraining member 141 is maintained in a state of covering the tubular member 140, and the tubular member 140 is restrained in a linear shape.

Figure 26:
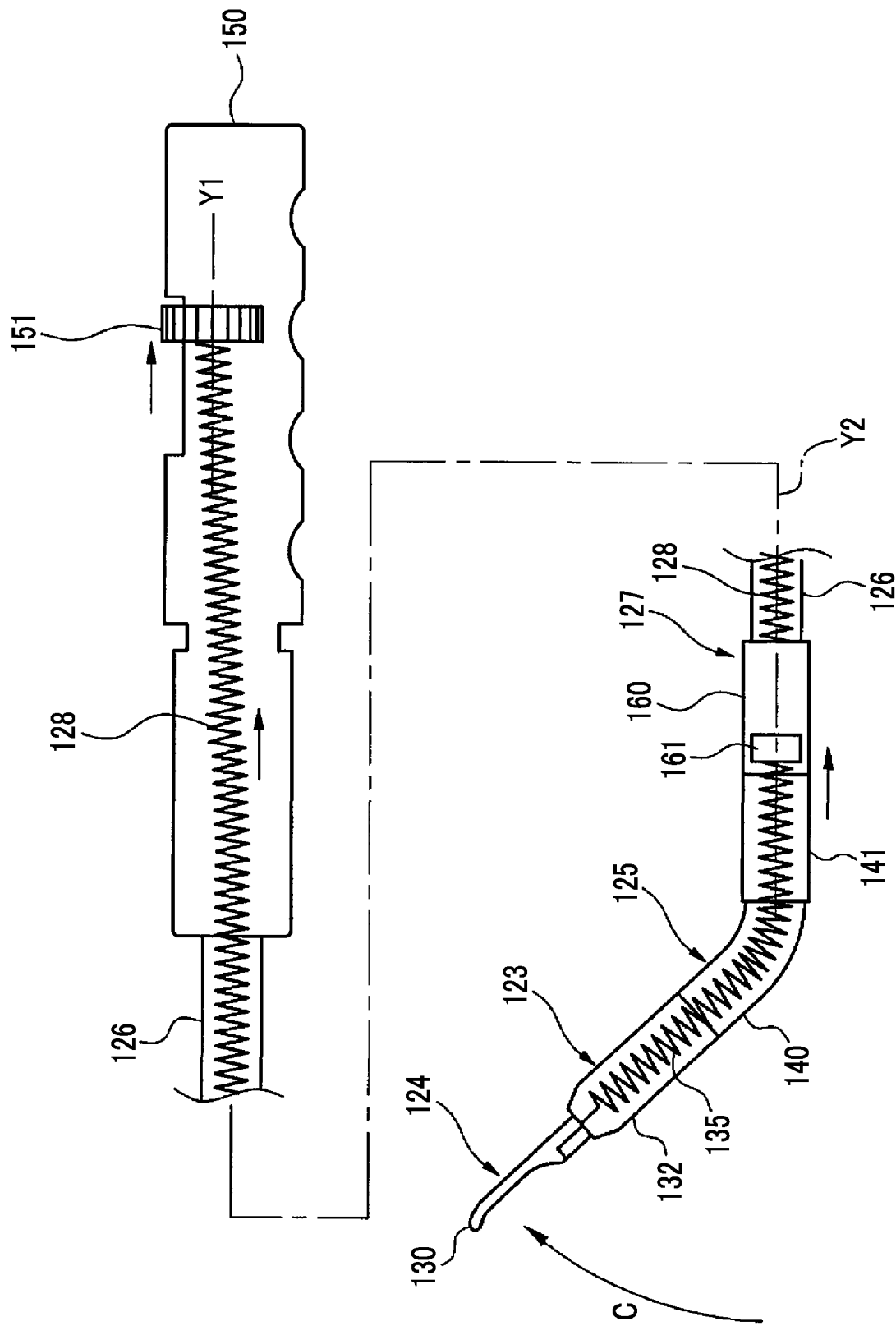
FIG. 26 is a view showing the operation of the transmitting part of FIG. 23.

Next, as shown in FIG. 26, in response to a translational operation of the operating member 151, the first member 160 is moved to an operating part 122 side along the second rotation axis Y2. The restraining member 141 is moved to the soft portion 126, and the tubular member 140 is released from the restraint of the restraining member 141. Accordingly, the tubular member 140 bends due to a restoring force of the tubular member 140, and the bendable part 125 is bent in the C-direction. In response to the translational operation of the operating member 151, the second member 161 is not rotated about the second rotation axis Y2, and the grip part 124 is maintained in a closed state.

The treatment tool for an endoscope 120 is used, for example, in the treatment method shown in FIGS. 15 to 18. First, the grip part 124 is closed based on an operation of the operating part 122, and the lesion part LA is gripped by the grip part 124. Then, after the lesion part LA is gripped by the grip part 124, the bendable part 125 is bent based on the operation of the operating part 122. Accordingly, the grip part 124 is erected, and the lesion part LA gripped by the grip part 124 is lifted.

In the treatment method described above, the gripping of the lesion part LA by closing the grip part 124 and the lifting of the lesion part LA by bending the bendable part 125 are performed only with an operation of the operating member 151 of the operating part 122 as described above. A closing operation of closing the grip part 124 and a bending operation of bending the bendable part 125 are independent of each other, and in a case where the grip part 124 is closed, the bendable part 125 is maintained in a linear shape, and a relative movement between the grip part 124 and the lesion part LA is prevented. Accordingly, the gripping of the lesion part LA and the lifting of the gripped lesion part LA can be easily performed with an operation of the treatment tool for an endoscope 120 alone.

The grip part 124 may be configured the same as the grip part shown in FIGS. 13 and 14, and be closed as the coil spring 135 extends in response to a rotational operation of the operating member 151.

Embodiment 2

Portions which are the same as in Embodiment 1 will not be described in Embodiment 2.

Figure 27:
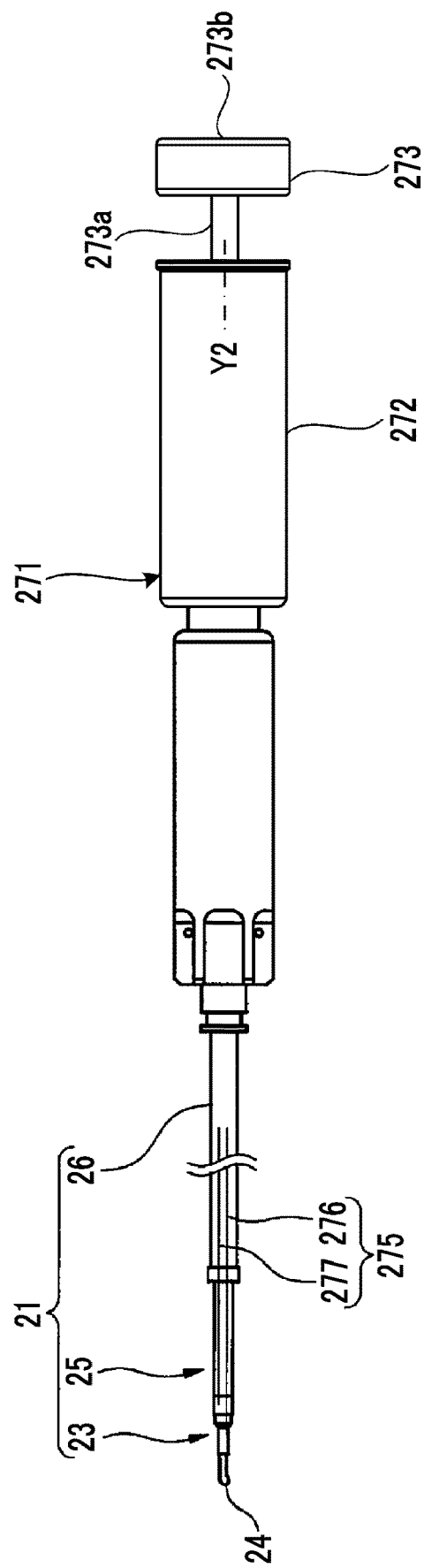
FIG. 27 is a view showing an example of a treatment tool for an endoscope, which is for describing Embodiment 2 of the present invention.

FIG. 27 shows an example of the treatment tool for an endoscope, which is for describing Embodiment 2 of the present invention.

A treatment tool for an endoscope 270 comprises the insertion part 21 that can be inserted into the first treatment tool channel 14 (see FIG. 1), an operating part 271, and a transmitting part 275. The insertion part 21 of the treatment tool for an endoscope 270 has the same configuration as in Embodiment 1 except for the structure of the bendable part 25. The structure of the bendable part 25 of the treatment tool for an endoscope 270 will be described later (for example, see FIGS. 28 to 30).

A closing operation of closing the grip part 24 and a bending operation of bending the bendable part 25 are input into the operating part 271. Specifically, the operating part 271 comprises a gripped part 272 and a piston 273. The gripped part 272 is formed in a hollow cylindrical shape, and is gripped by, for example, the palm and four fingers excluding the thumb of one hand of a user.

The piston 273 is an operating member that is rotatable with respect to the gripped part 272 about the first rotation axis Y1, which is the same as or is parallel to a central axis of the gripped part 272, and is translatable with respect to the gripped part 272 along the first rotation axis Y1. Specifically, the piston 273 has a shaft part 273a and a rotating member 273b.

The shaft part 273a is a cylindrical member accommodated in the operating part 271, is movable parallel to the central axis of the gripped part 272, and is rotatable about the first rotation axis Y1 which is the same as or is parallel to the central axis of the gripped part 272.

The rotating member 273b is a portion operated by the user gripping the gripped part 272 with a fingertip, and is formed in a chamfered disk shape. The rotating member 273b is connected to the shaft part 273a, and is exposed from the gripped part 272.

For example, the user can perform an operation of rotating the rotating member 273b with respect to the gripped part 272 about the first rotation axis Y1 by turning a side surface of the rotating member 273b with the thumb. In this case, the user may rotate the rotating member 273b using also the index finger in addition to the thumb. In addition, the user can perform an operation of pushing the piston 273 into the gripped part 272 by pressing an upper surface of the rotating member 273b with the thumb.

The transmitting part 275 has a first transmitting member 276 that extends from the grip part 24 toward the operating part 271 and a second transmitting member 277 that extends from the bendable part 25 toward the operating part 271. The first transmitting member 276 and the second transmitting member 277 are accommodated inside the soft portion 26. A closing operation input into the operating part 271 is transmitted to the grip part 24 via the first transmitting member 276, and a bending operation input into the operating part 271 is transmitted to the bendable part 25 via the second transmitting member 277.

For example, an operation of rotating the piston 273 with respect to the gripped part 272 is a closing operation of closing the grip part 24. The closing operation input into the operating part 271 is transmitted to the grip part 24 via the first transmitting member 276. In addition, an operation of pushing the piston 273 into the gripped part 272 is a bending operation of bending the bendable part 25. The bending operation input into the operating part 271 is transmitted to the bendable part 25 via the second transmitting member 277.

Figure 28:
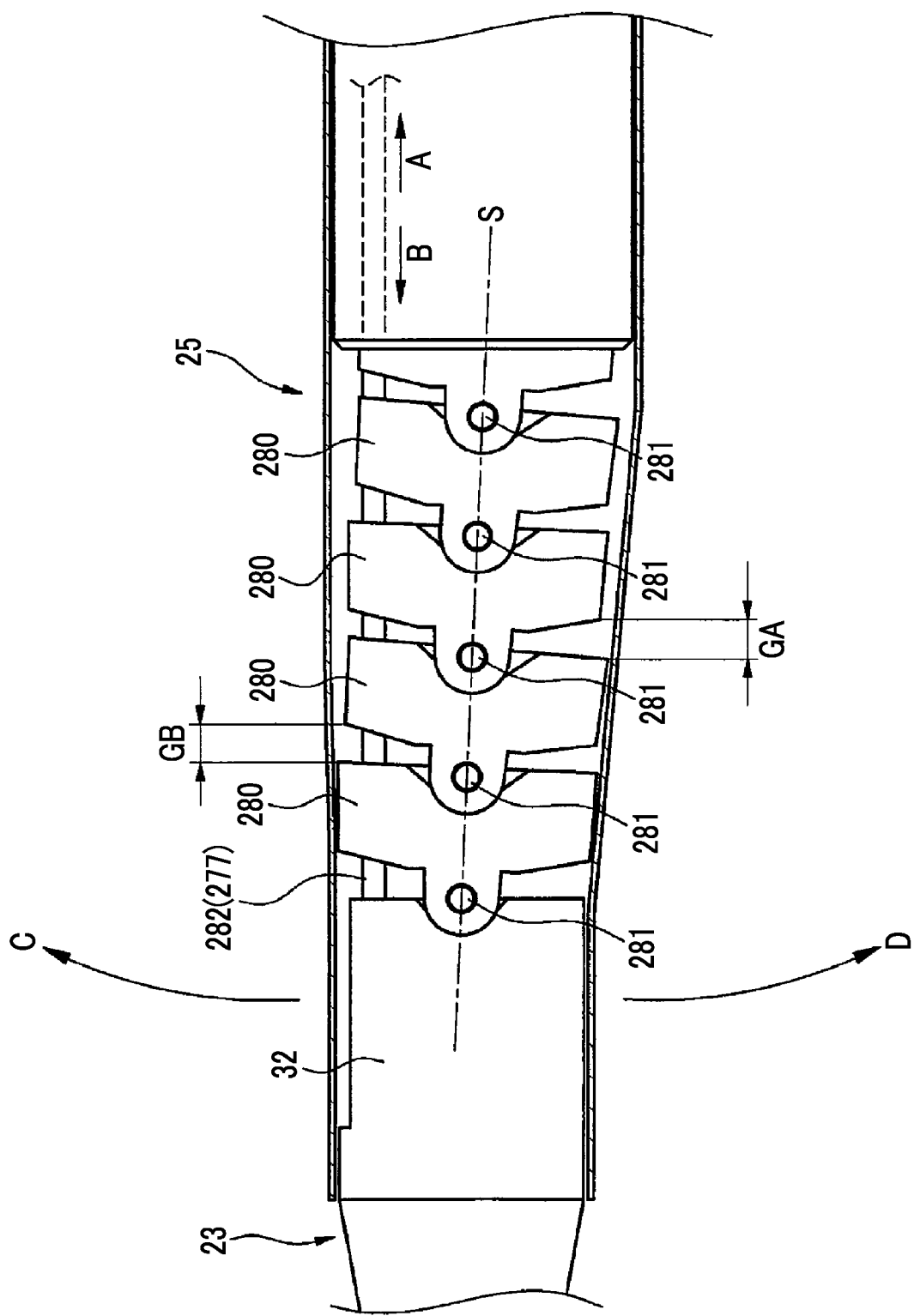
FIG. 28 is a view showing a bendable part of the treatment tool for an endoscope of FIG. 27.
Figure 29:
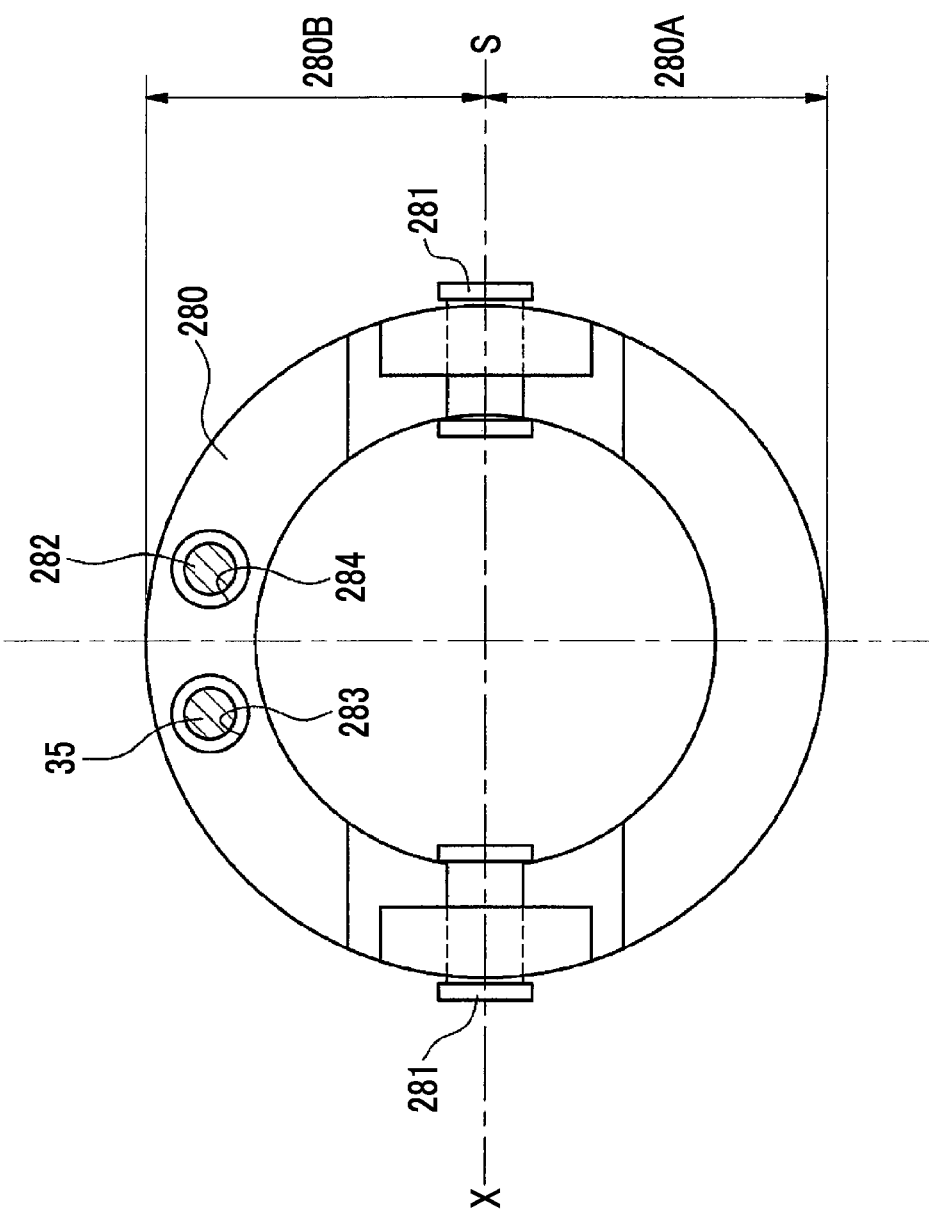
FIG. 29 is a view showing a cross section of the bendable part of FIG. 28.
Figure 30:
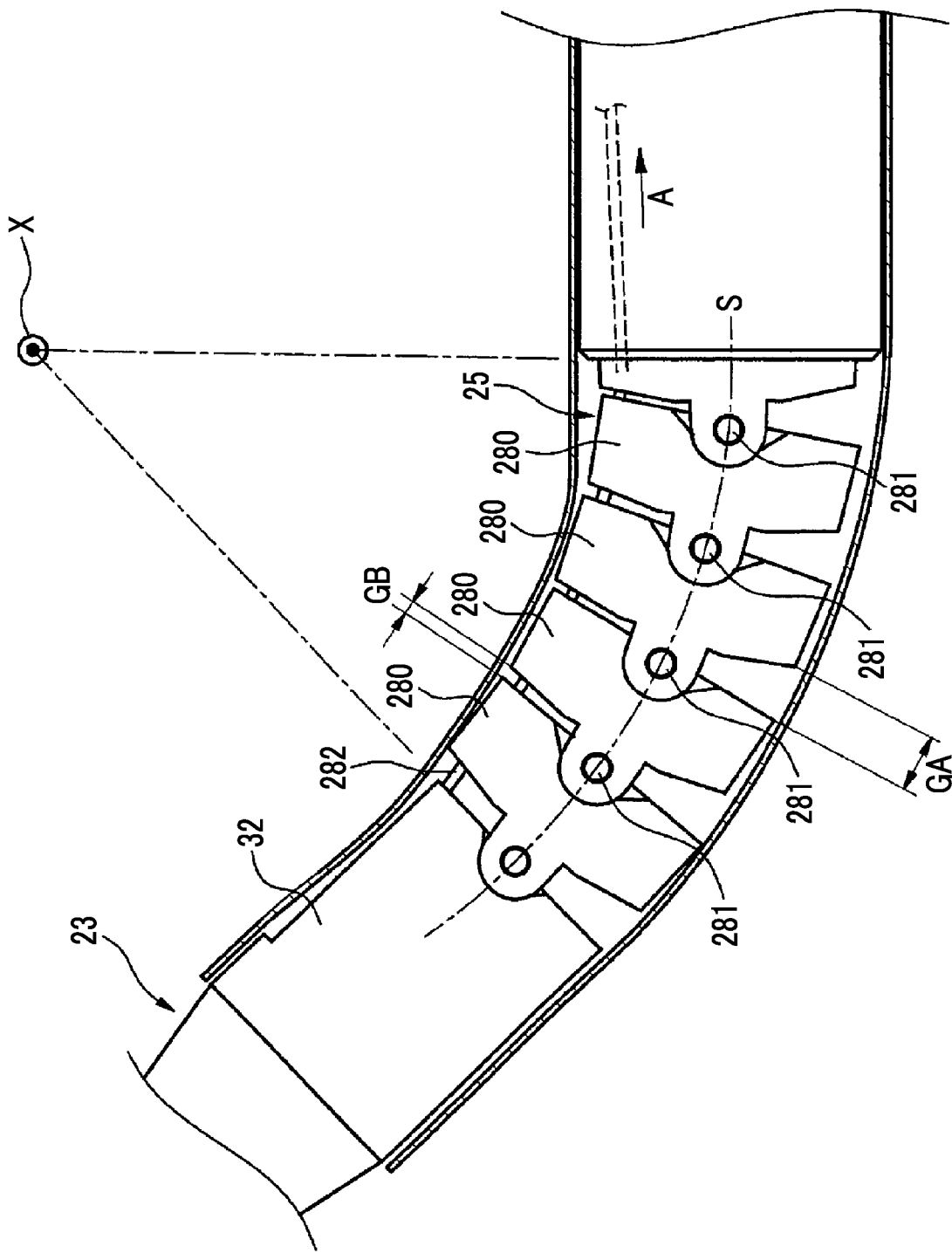
FIG. 30 is a view showing an operation of the bendable part of FIG. 28.

FIGS. 28 to 30 show the bendable part 25 of FIG. 27.

The bendable part 25 of FIG. 27 has a plurality of cyclic members 280 arranged in the axial direction of the insertion part 21, and two cyclic members 280, which are adjacent to each other, are connected to each other by a pair of pins 281. The two cyclic members 280 connected to each other by the pair of pins 281 are rotatable with respect to each other about a rotation axis x passing through the pair of pins 281. The bending of the bendable part 25 is the sum of rotations of the plurality of cyclic members 280. The bending central axis X for the bending of the bendable part 25 is parallel to the rotation axis x, and is parallel to the opening and closing direction of the pair of grip claws 30.

A plane of which a length along the central axis of the insertion part 21 is constant regardless of the bending of the bendable part 25 is defined as a bent neutral plane, and a bent neutral plane S of the bendable part 25 passes through the plurality of pins 281 arranged in the axial direction of the insertion part 21. In a case where the cyclic member 280 is divided into a first portion 280A and a second portion 280B with the bent neutral plane S as a boundary, there is a gap GA between the first portions 280A of the two cyclic members 280 adjacent to each other, and there is a gap GB also between the second portions 280B. Therefore, the bendable part 25 is bendable in the C-direction in which the gap GB on a second portion 280B side is narrowed, and is bendable also in the D-direction in which the gap GA on a first portion 280A side is narrowed.

The bendable part 25 is bendable in both directions including the C-direction and the D-direction, but is bent in the C-direction based on an operation of the operating part 271. As an end part of a wire 282 on a side of the operating part 271 is fixed to the gripped part 272 and the wire is moved to the operating part 271 side relatively to the bendable part 25, the bendable part 25 is bent. A distal end part of the wire 282 is fixed to the support 32 of the distal end part 23. In a case where the bendable part 25 is pushed into a side of the distal end part 23, the wire 282 moves to the operating part 271 side relatively to the bendable part 25. Herein, as for movement of the wire 282, pulling to the operating part 271 side is defined as a movement in the A-direction, and pushing out to the distal end part 23 side is defined as a movement in the B-direction.

In the bending of the bendable part 25 in the C-direction, the first portion 280A of the cyclic member 280 is positioned on the bent outer diameter side, and the second portion 280B is positioned on the bent inner diameter side. In the second portion 280B positioned on the bent inner diameter side, a first guide 283 and a second guide 284 are provided. The first guide 283 and the second guide 284 each are a hole that penetrates the second portion 280B in the axial direction of the insertion part 21, the wire 35 is inserted in the first guide 283, and the wire 282 is inserted in the second guide 284.

The wire 35 is an example of the first transmitting member 276 that extends from the piston 273 to the insertion part 21 and closes the grip part 24 in response to a rotation of the piston 273. The wire 35 is moved in the A-direction which is the side of the operating part 271 in response to the rotation of the piston 273, and closes the grip part 24 by moving in the A-direction.

The wire 35 inserted in the first guide 283 and the wire 282 inserted in the second guide 284 are disposed on the bent inner diameter side in the bending of the bendable part 25 in the C-direction. The first guide 283 and the second guide 284 are not limited to the holes insofar as the wire 35 and the wire 282 can be held so as to be able to be pushed and pulled in the axial direction of the insertion part 21.

As the wire 282 in the bendable part 25 is moved in the A-direction (first direction) based on an operation of the operating part 271, the gap GB on the second portion 280B side, which is between the two cyclic members 280 adjacent to each other, is narrowed, and the bendable part 25 is bent in the C-direction. On the other hand, as the wire 282 is moved in the B-direction in a state where the bendable part 25 is bent in the C-direction, the bendable part 25 is extended in a linear shape.

The wire 282 may be an object that has flexibility, which does not hinder the bending of the bendable part 25 and the deformation of the soft portion 26, and can transmit a force in the A-direction and the B-direction, and may be, for example, a coil spring. In addition, the wire 282 may be a tube that is filled with a working fluid therein and is provided with a piston at the distal end part thereof.

Figure 31:
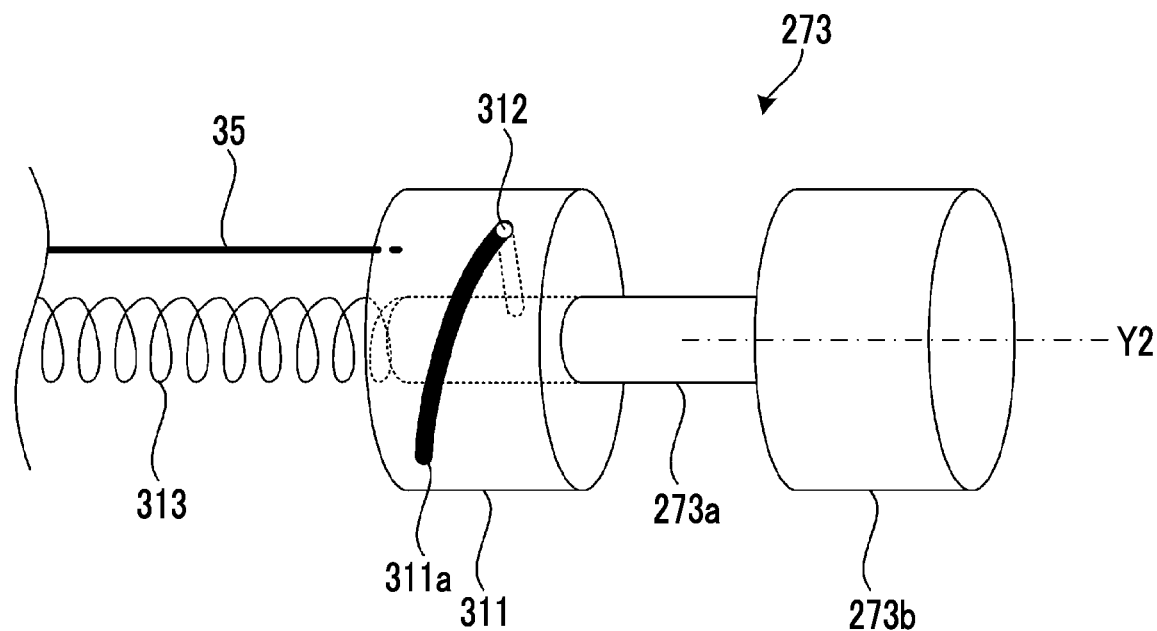
FIG. 31 is a view showing a piston of FIG. 27.

As shown in FIG. 31, an end part of the shaft part 273a of the piston 273, which is on an opposite side to the rotating member 273b, is engaged with a cam member 311. The end part of the shaft part 273a, which is on an opposite side to the rotating member 273b, is connected to one end of a coil spring 313. The other end of the coil spring 313 is fixed to a vicinity of an end part of the bendable part 25, which is on the side of the operating part 271.

The coil spring 313 is an example of the second transmitting member 277 that extends from the piston 273 to the insertion part 21 and bends the bendable part 25 in response to translation of the piston 273.

The cam member 311 is an example of a moving member that is moved in the A-direction in response to a rotation of the piston 273. In this example, the cam member 311 is a cylindrical member having a hollow shape, and the shaft part 273a is engaged with a hollow portion of the cam member 311. The cam member 311 is movable with respect to the shaft part 273a in an axial direction of the shaft part 273a inside the hollow cylindrical gripped part 272 (see FIG. 27), but is provided not to rotate with respect to the shaft part 273a with the shaft part 273a as a rotation axis. Such a structure can be realized, for example, by providing, at a portion where the hollow portion of the cam member 311 and the shaft part 273a are engaged with each other, an engaging part that is slidable with respect to each other only in the axial direction of the shaft part 273a.

In addition, one end of the wire 35 on the side of the operating part 271 is fixed to the cam member 311. In addition, the cam member 311 has a cam groove 311a in a side surface thereof. The cam groove 311a is provided from a part of the side surface of the cam member 311 to the hollow portion of the cam member 311. In addition, the cam groove 311a is provided diagonally in a part of the side surface of the cam member 311, that is, in a spiral shape about an axial direction of the cam member 311.

A cam pin 312 perpendicular to the axial direction of the shaft part 273a is provided at a portion of the shaft part 273a, which engages with the cam member 311. The cam pin 312 is slidably engaged with the cam groove 311a.

Figure 32:
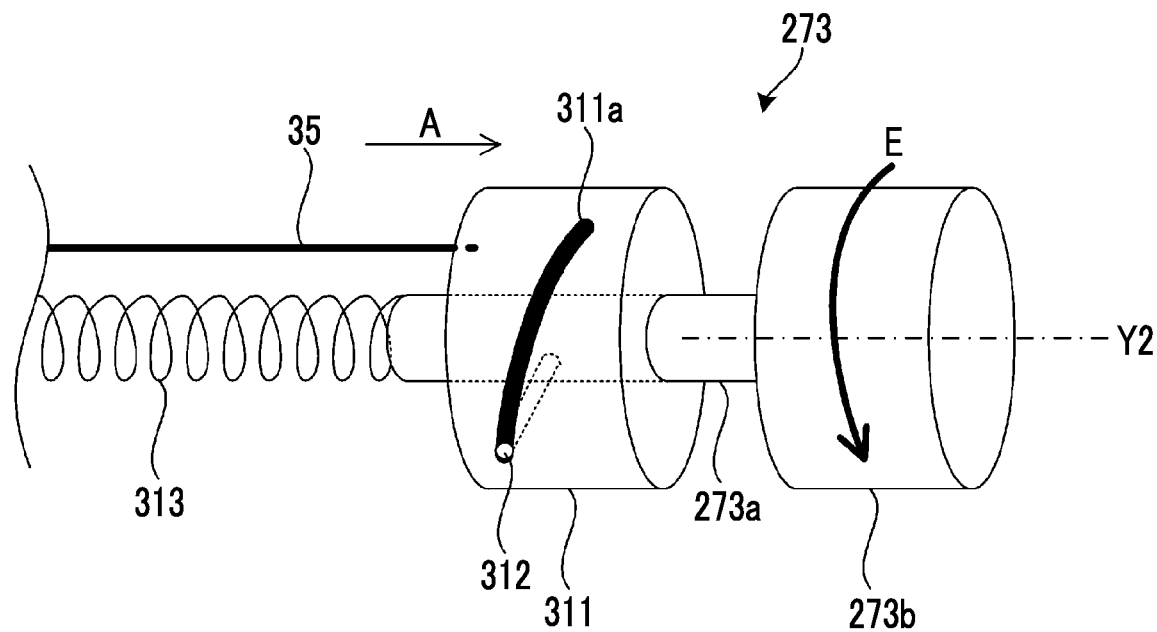
FIG. 32 is a view showing an operation of the piston FIG. 27.

As shown in FIG. 32, in a case where the piston 273 rotates in an E-direction about the second rotation axis Y2, the cam member 311 is moved in the A-direction due to the rotation of the cam pin 312. Accordingly, the wire 35 which is the first transmitting member 276 is moved in the A-direction, and the grip part 24 is closed.

Figure 33:
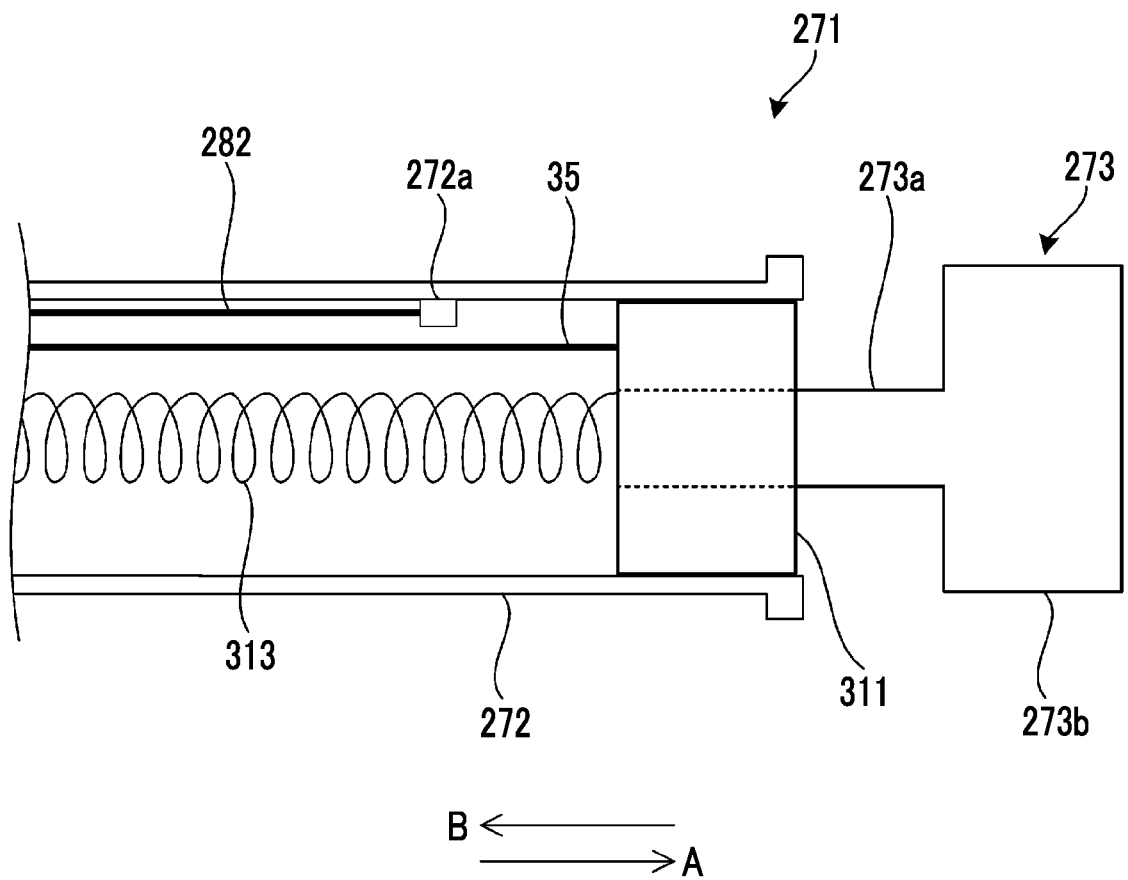
FIG. 33 is a view showing an operating part of FIG. 27.

As shown in FIG. 33, an end part of the wire 282 on the side of the operating part 271 is fixed to the gripped part 272. In the example, a fixing member 272a is provided on an interior wall of the gripped part 272, and the end part of the wire 282 is fixed to the fixing member 272a.

Figure 34:
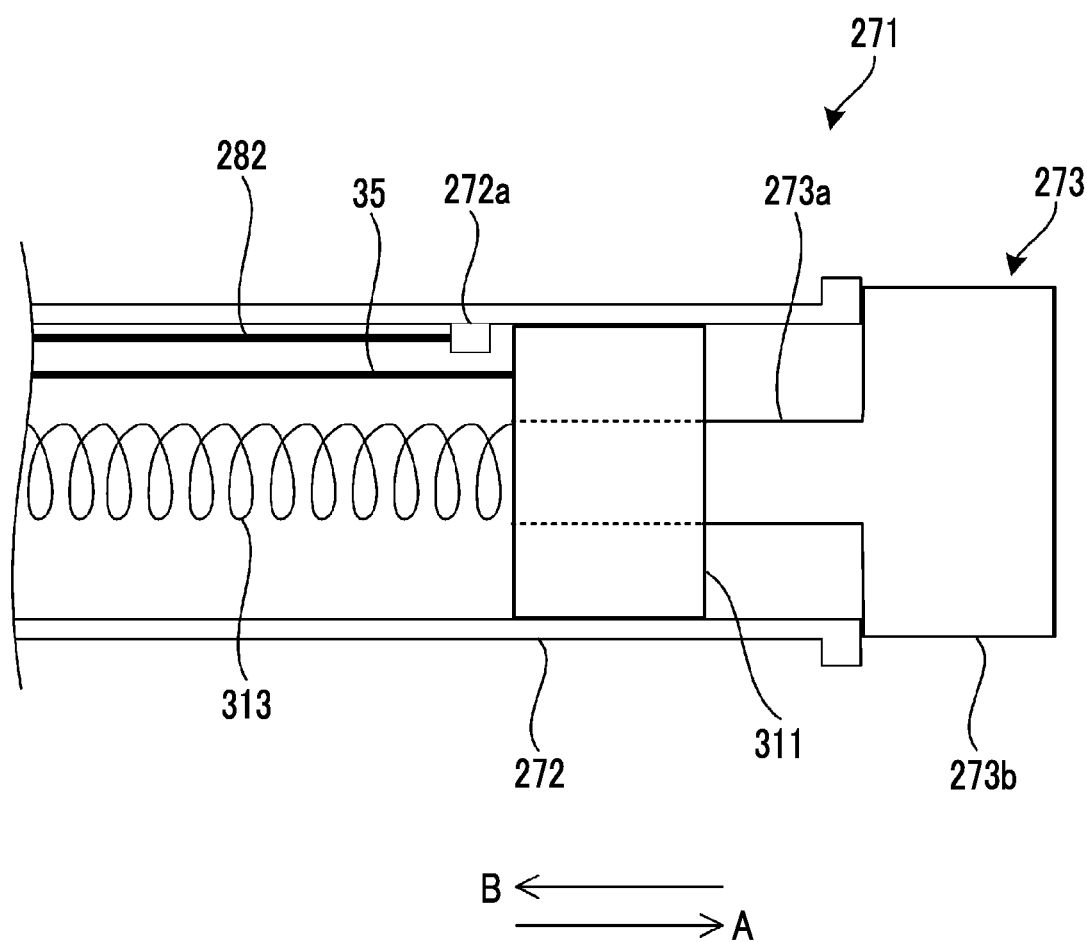
FIG. 34 is a view showing an operation of the operating part of FIG. 27.

As shown in FIG. 34, in a case where the piston 273 is pushed into the gripped part 272, the coil spring 313 fixed to the shaft part 273a of the piston 273 is moved in the B-direction. Accordingly, the bendable part 25 is pushed in the B-direction by the coil spring 313. On the other hand, since the wire 282 is fixed to the gripped part 272, the wire is not moved in the A-direction even in a case where the piston 273 is pushed into the gripped part 272. Therefore, the wire 282 is moved in the A-direction relatively to the bendable part 25, and the bendable part 25 is bent.

As described above, the coil spring 313, which is an example of the second transmitting member 277, is moved in the B-direction (second direction), which is the side of the distal end part 23, in response to translation of the piston 273 and pushes the bendable part 25 in the B-direction by moving in the B-direction. Accordingly, the wire 35 is moved in the A-direction relatively to the bendable part 25, and the bendable part 25 is bent.

Figure 35:
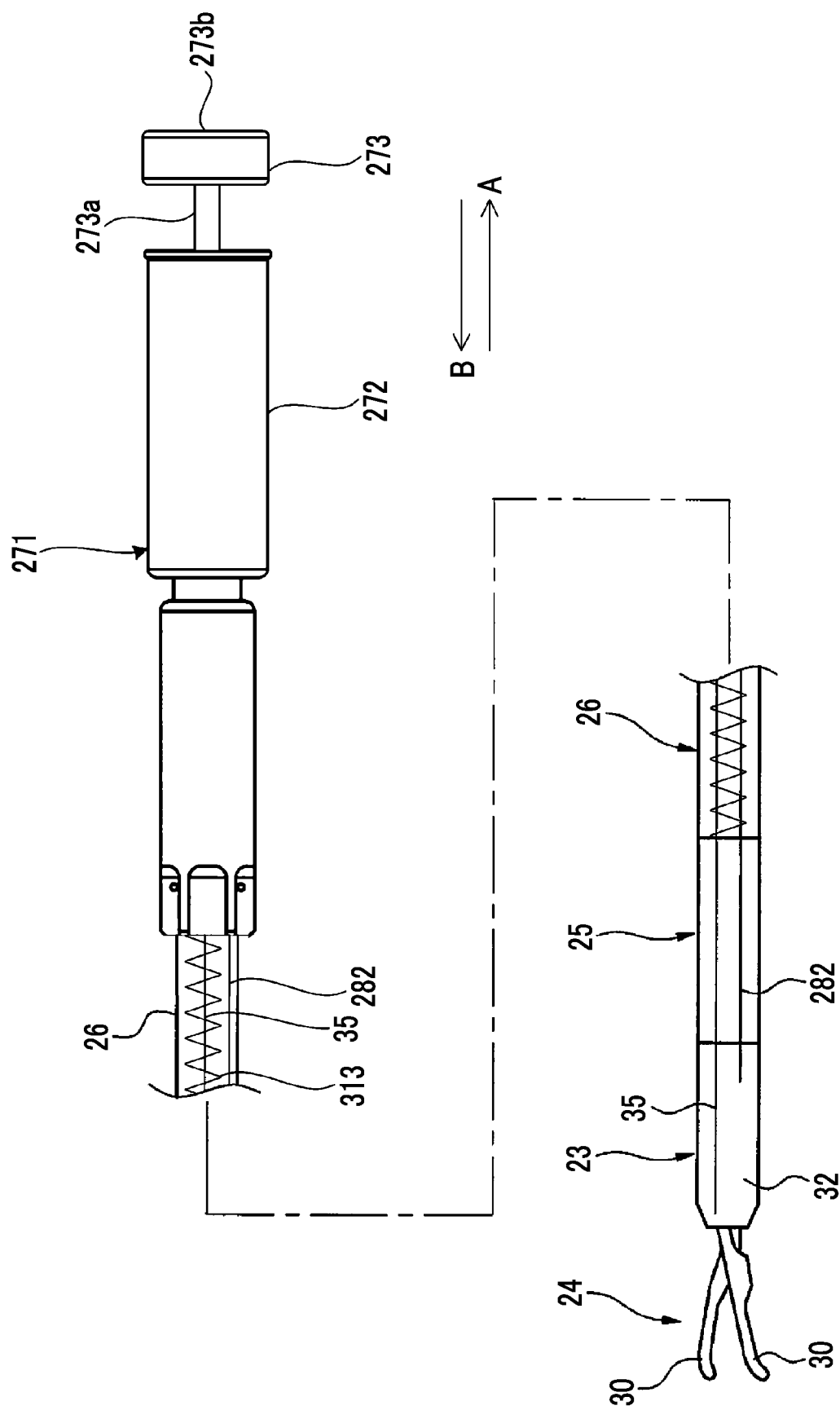
FIG. 35 is a view showing an operation of the treatment tool for an endoscope of FIG. 27.

FIG. 35 shows a state where the piston 273 is not operated with respect to the gripped part 272. In this state, the grip part 24 is open, and the bendable part 25 extends in a linear shape.

In the state shown in FIG. 35, in a case where an operation of rotating the piston 273 in the E-direction with respect to the gripped part 272 is performed, the wire 35 is pulled in the A-direction. Therefore, as shown in FIG. 36, the grip part 24 is closed, but the bendable part 25 remains being extended in a linear shape.

Figure 36:
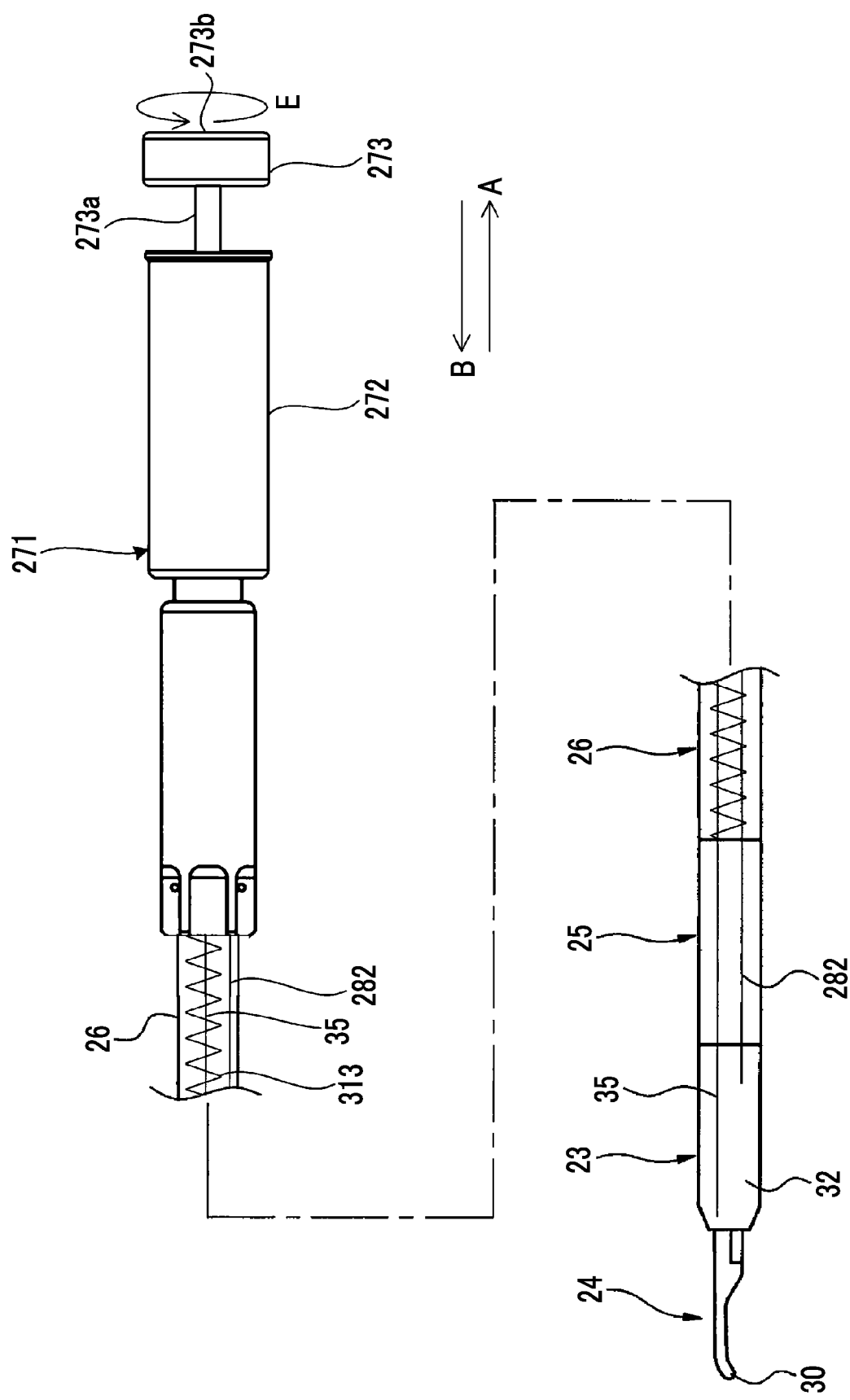
FIG. 36 is a view showing the operation of the treatment tool for an endoscope of FIG. 27.

In a case where an operation of pushing the piston 273 in the B-direction with respect to the gripped part 272 is performed in the state shown in FIG. 36, the coil spring 313 is moved in the B-direction, but the wire 282 fixed to the gripped part 272 is not moved in the B-direction. Accordingly, the wire 282 is moved in the A-direction relatively to the bendable part 25. Therefore, the bendable part 25 is bent while the grip part 24 is closed.

Figure 37:
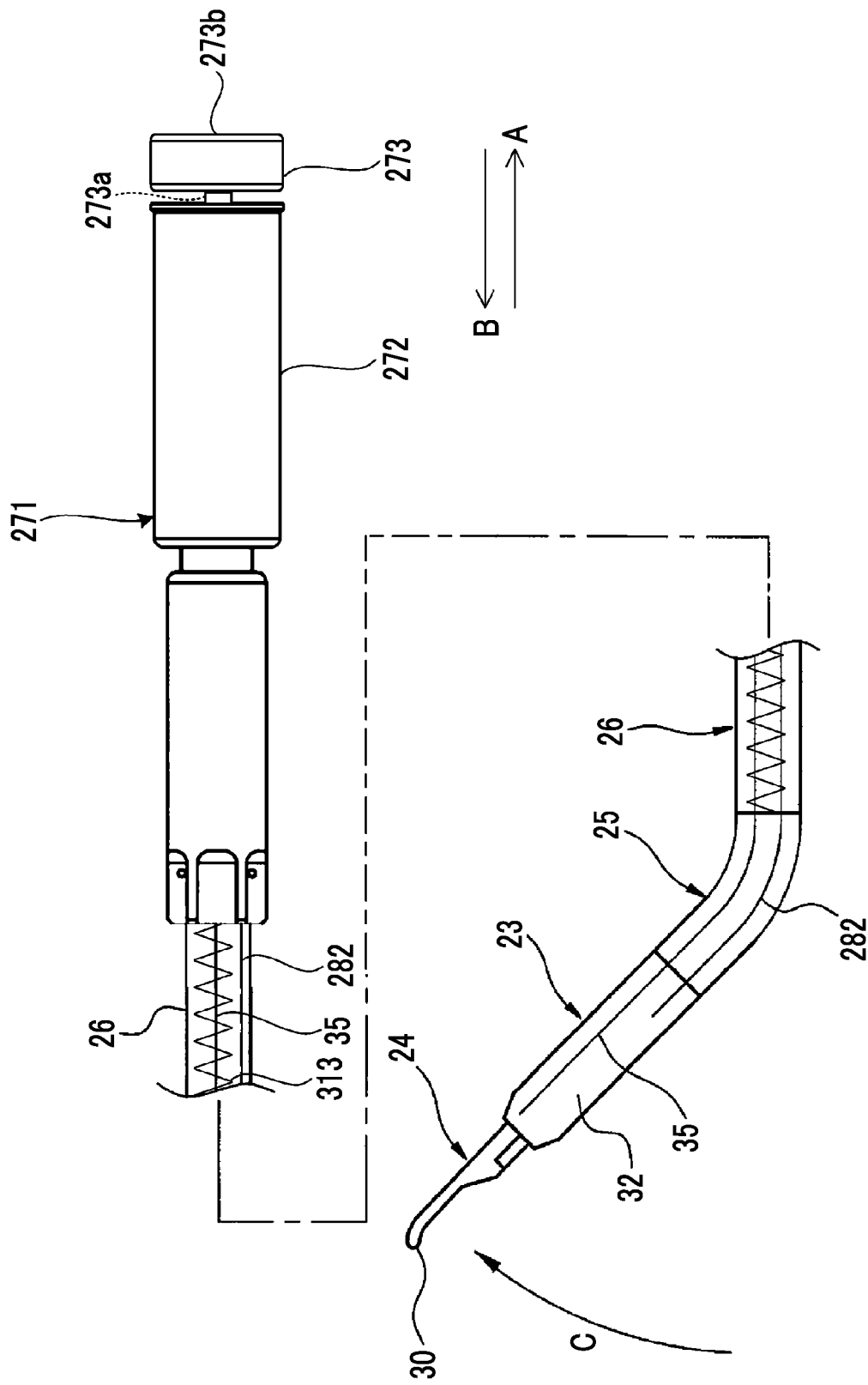
FIG. 37 is a view showing the operation of the treatment tool for an endoscope of FIG. 27.

That is, in a state where the piston 273 is not operated as shown in FIG. 35, the grip part 24 is open, and the bendable part 25 extends in a linear shape. In a case where an operation of first rotating the piston 273 with respect to the gripped part 272 from this state and then pushing the piston 273 with respect to the gripped part 272 is performed, first, the grip part 24 is closed as shown in FIG. 36, and next the bendable part 25 is bent as shown in FIG. 37.

Figure 38:
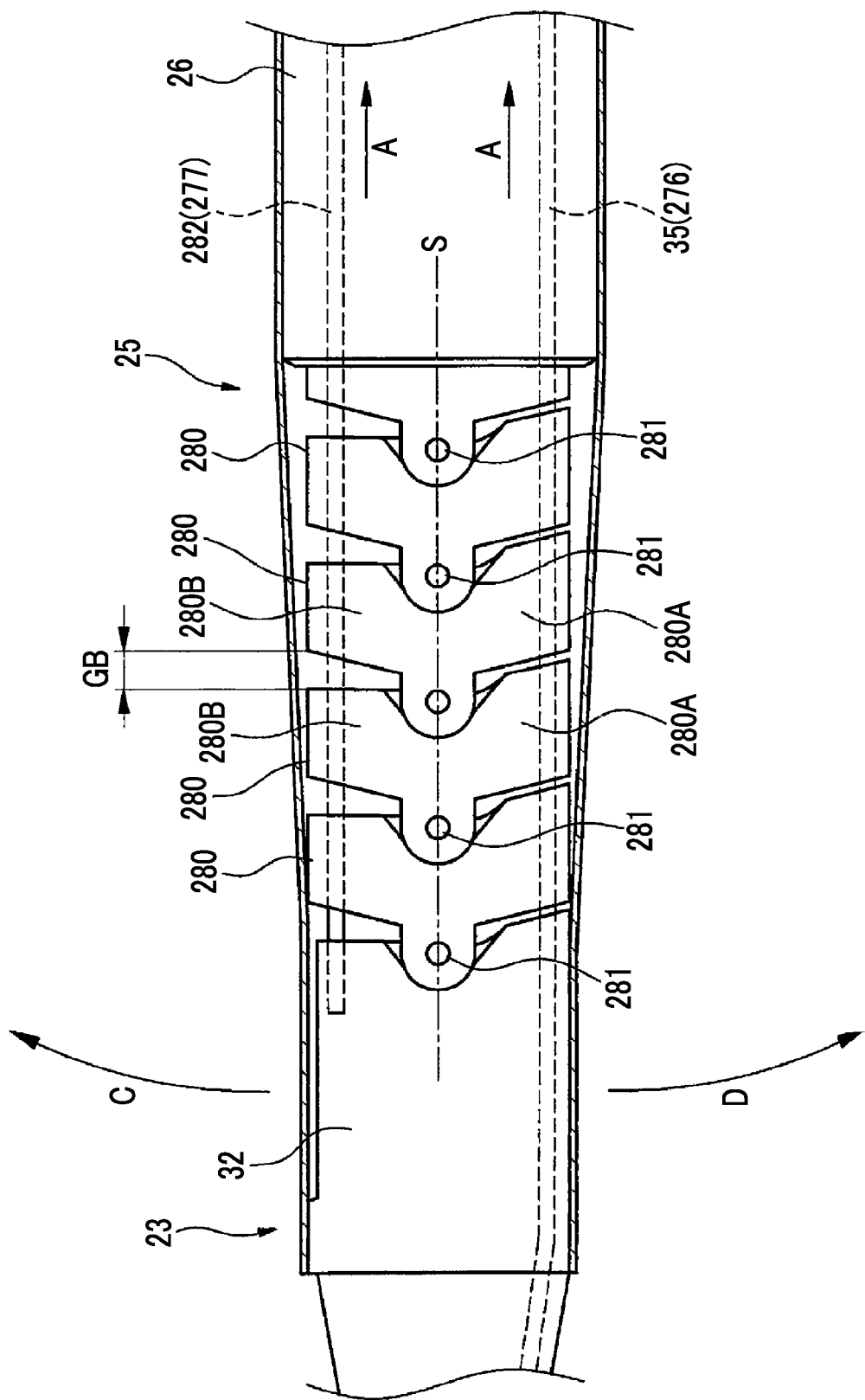
FIG. 38 is a view showing a modification example of the bendable part of FIG. 27.
Figure 39:
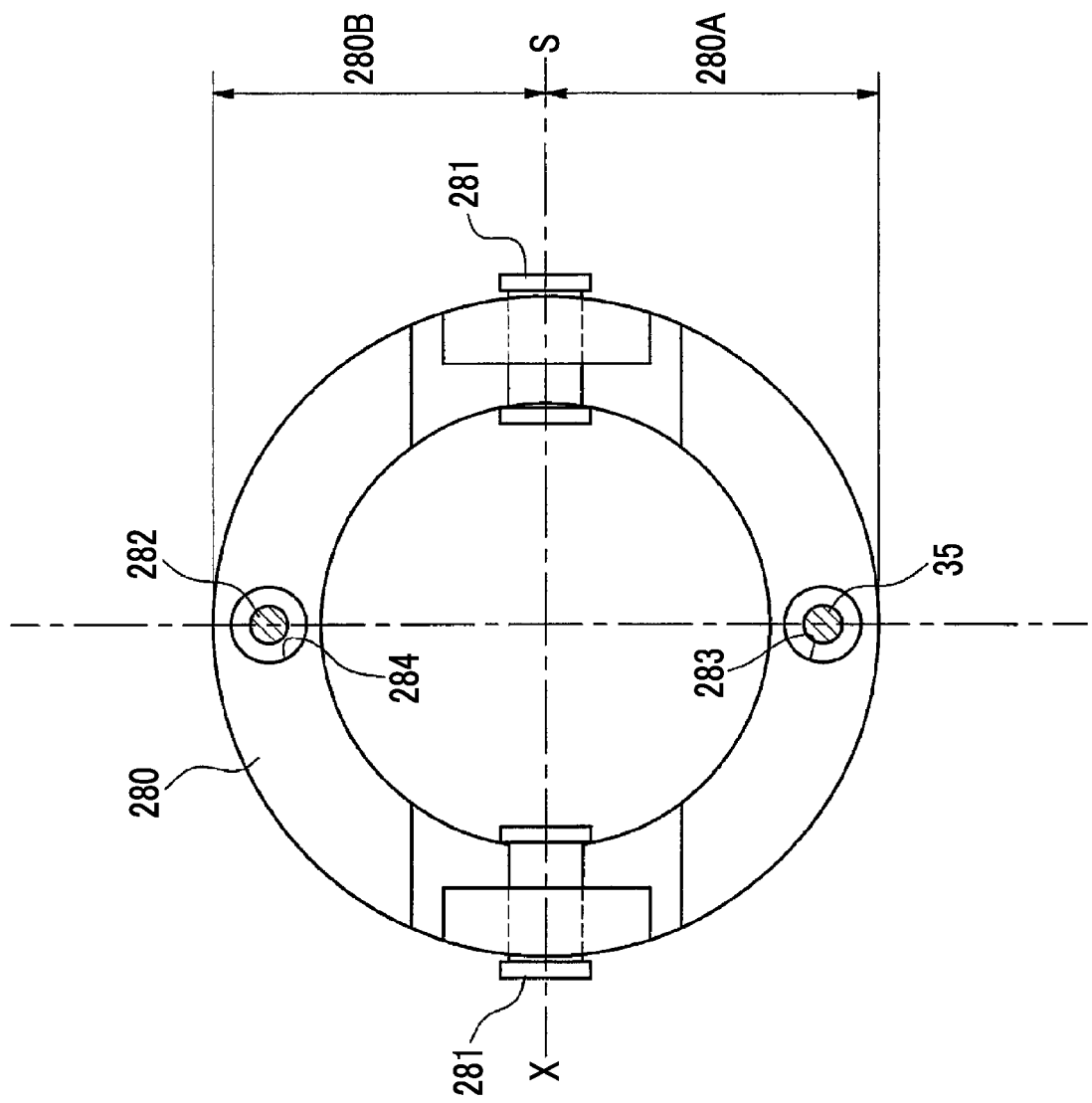
FIG. 39 is a view showing a cross section of the bendable part of FIG. 38.

In a case where the cyclic member 280 is divided into the first portion 280A and the second portion 280B with the bent neutral plane S of the bendable part 25 as a boundary, in the bendable part 25 shown in FIGS. 38 and 39, the second portions 280B of the two cyclic members 280 adjacent to each other are contactless with the gap GB therebetween, but the first portions 280A are in contact with each other. Therefore, the bendable part 25 is bendable only in the C-direction, in which the gap GB is narrowed, and is not bendable in the D-direction opposite to the C-direction.

In the bending of the bendable part 25 in the C-direction, the first portion 280A of the cyclic member 280 is positioned on the bent outer diameter side, and the second portion 280B is positioned on the bent inner diameter side. The first guide 283 that holds the wire 35 is provided at the first portion 280A, and the wire 35 is disposed on the bent outer diameter side. The second guide 284 that holds the wire the wire 282 is provided at the second portion 280B, and the wire 282 is disposed on the bent inner diameter side.

The gap GB is narrowed as the wire 282 is moved in the A-direction relatively to the bendable part 25, and thus the bendable part 25 is bent in the C-direction. In a case where the wire 35 is disposed on the bent outer diameter side which is an opposite side to the wire 282 with the bent neutral plane S interposed therebetween and the bendable part 25 is bent due to the friction of the wire 35 moved in the A-direction, the bendable part 25 is bent in the D-direction opposite to the C-direction, but the bendable part 25 is not bendable in the D-direction. Therefore, based on an operation of the operating part 22, the wire 35 is moved in the A-direction, and in a case where the grip part 24 is closed, the bendable part 25 is reliably maintained in a linear shape. Accordingly, a relative movement between the grip part 24 and the lesion part LA gripped by the grip part 24 is prevented, and the gripping of the lesion part LA becomes even easier.

The wire 35 may be disposed on the bent neutral plane S. In a case where the wire 35 is disposed on the bent neutral plane S, the first guide 283 holding the wire 35 is provided, for example, in an end part of the pin 281.

Figure 40:
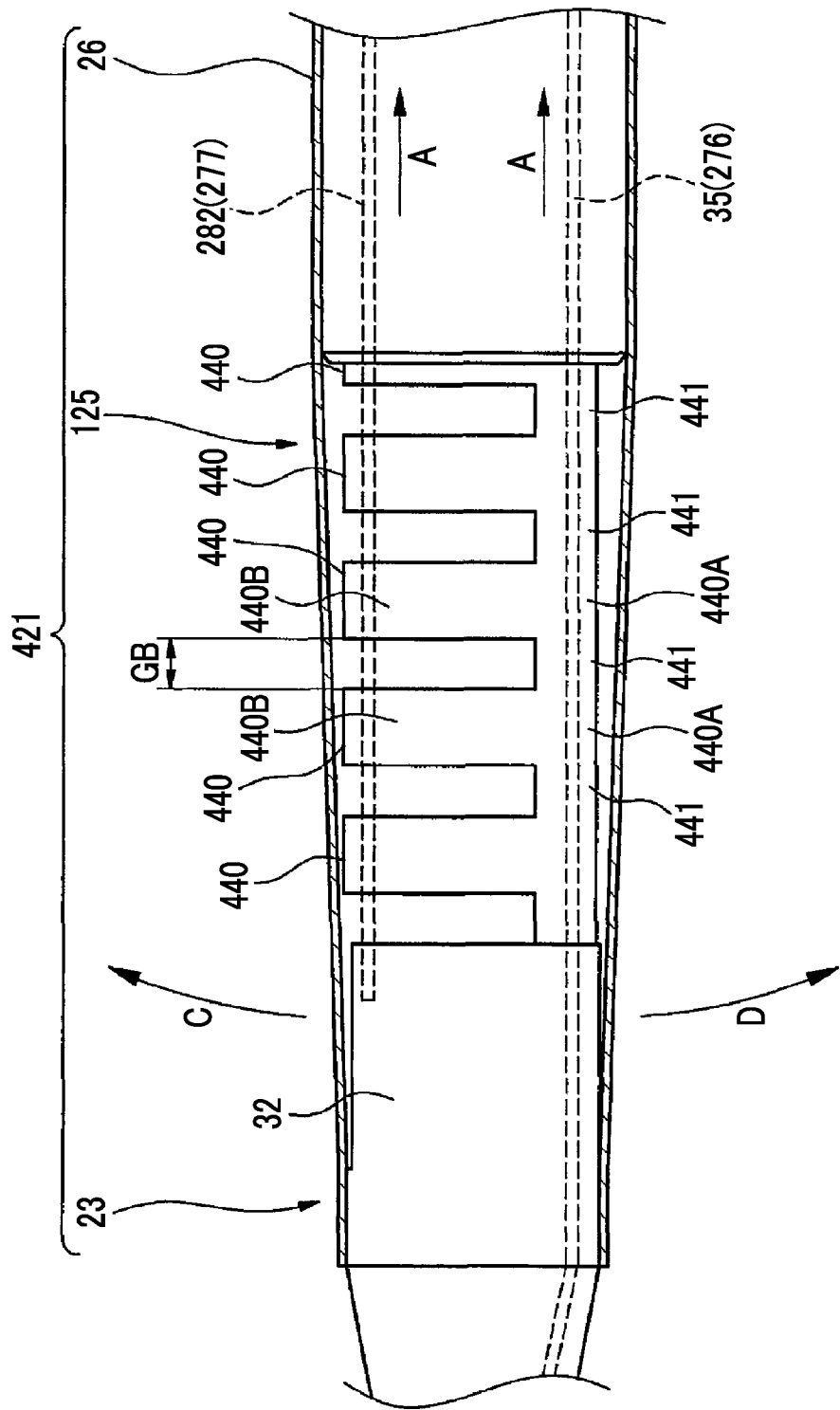
FIG. 40 is a view showing another example of the bendable part of the treatment tool for an endoscope, which is for describing Embodiment 2 of the present invention.

Also a treatment tool for an endoscope 420 shown in FIGS. 40 and 41 is also configured such that the bendable part is bendable in one direction and is not bendable in an opposite direction. The treatment tool for an endoscope 420 and the treatment tool for an endoscope 20 described above are different from each other only in terms of the configuration of the bendable part. Thus, common elements will be assigned with common reference numerals, and description thereof will be omitted.

An insertion part 421 of the treatment tool for an endoscope 420 comprises the distal end part 23, the bendable part 125, and the soft portion 26. The bendable part 125 has a plurality of cyclic portions 440 arranged in an axial direction of the insertion part 421 and one or more connecting portions 441 that connect two cyclic portions 440 adjacent to each other. The cyclic portions 440 and the connecting portions 441 are formed integrally with each other. In a cross section perpendicular to the axial direction of the insertion part 421, the connecting portions 441 are formed in an arc shape that is concave to a central axis side of the insertion part 421.

In a case where the cyclic portion 440 is divided into a first portion 440A connected to the connecting portion 441 and a second portion 440B excluding the first portion 440A, there is the gap GB between the second portions 440B of the two cyclic portions 440 adjacent to each other. The connecting portion 441 having an arc-shaped cross section is capable of only bending a concave surface inward of bending the concave surface inward or bending the concave surface outward. Therefore, the bendable part 125 is bendable only in the C-direction, in which the gap GB is narrowed, with the bending of the concave surface of the connecting portion 441 inward, and is not bendable in the D-direction opposite to the C-direction. The bent neutral plane S of the bendable part 125 passes through a circumferential middle portion of each of the plurality of connecting portions 441 arranged in the axial direction of the insertion part 421.

The wire 282 is disposed on the bent inner diameter side in the bending of the bendable part 125 in the C-direction. The gap GB is narrowed as the wire 282 is moved in the A-direction relatively to the bendable part 125, and thus the bendable part 125 is bent in the C-direction. The wire 35 is disposed on the bent neutral plane S of the bendable part 125. Since the bendable part 125 is not bendable in the D-direction opposite to the C-direction, based on an operation of the operating part 271, the wire 35 is moved in the A-direction, and in a case where the grip part 24 is closed, the bendable part 125 is reliably maintained in a linear shape. Accordingly, a relative movement between the grip part 24 and the lesion part LA gripped by the grip part 24 is prevented, and the gripping of the lesion part LA becomes even easier.

As described above, the operating part 271 of the treatment tool for an endoscope 270 of Embodiment 2 has the gripped part 272 that is gripped by the user and the piston 273 (operating member) that is rotatable about the first rotation axis with respect to the gripped part 272 and is translatable along the first rotation axis with respect to the gripped part 272. In addition, the transmitting part 275 has the first transmitting member 276 (wire 35) that extends from the piston 273 to the insertion part 21 and closes the grip part 24 in response to a rotation of the piston 273 and the second transmitting member 277 (coil spring 313) that extends from the piston 273 to the insertion part 21 and bends the bendable part 25 in response to translation of the piston 273.

For this reason, the gripping of the lesion part LA and the lifting of the gripped lesion part LA can be performed with an operation that is easy to exert a force, such as pushing and rotating the piston 273 with a fingertip (for example, the thumb and the index finger) of the hand gripping the gripped part 272.

In addition, the gripping of the lesion part LA by closing the grip part 24 and the lifting of the lesion part LA by bending the bendable part 25 are performed only with an operation of the piston 273. A closing operation of closing the grip part 24 and a bending operation of bending the bendable part 25 are independent of each other, and in a case where the grip part 24 is closed, the bendable part 25 is maintained in a linear shape, and a relative movement between the grip part 24 and the lesion part LA is prevented. Accordingly, the gripping of the lesion part LA and the lifting of the gripped lesion part LA can be easily performed with an operation of the treatment tool for an endoscope 270 alone.

In addition, since a closing operation and a bending operation can be performed by the rotation and translation of the piston 273, the user can perform the operations without considering the direction of the operating part 271 in a case of gripping the operating part 271.

The operating part 271 described in Embodiment 2 is applicable to each configuration of Embodiment 1. For example, although a case where the grip part 24 is closed and the bendable part 25 is bent in response to an operation has been described in Embodiment 2, as in the example shown in Embodiment 1, a configuration where the grip part 24 is opened and the bendable part 25 is restored to a linear shape by performing a reverse operation may be adopted.

Although various types of embodiments have been described hereinbefore with reference to the drawings, it is evident that the present invention is not limited to such examples. It is clear that those skilled in the art can come up with various types of changed examples or modified examples within the scope of claims, and it is understood that those examples obviously belong to the technical scope of the present invention. In addition, without departing from the gist of the invention, each of components in the embodiments may be combined in any manner.

This application is based on the U.S. provisional application filed on Sep. 6, 2019 (62/896,581) and the US provisional application filed on Aug. 18, 2020 (63/067,295), the content of which is incorporated herein by reference.

EXPLANATION OF REFERENCES

1: endoscope system
2: endoscope
3: light source device
4: processor
5: monitor
6: endoscope insertion part
7: endoscope operating part
8: universal cord
9: connector
10: endoscope distal end part
11: endoscope bendable part
12: endoscope soft portion
13: first treatment tool insertion opening
14: first treatment tool channel
15: second treatment tool insertion opening
16: second treatment tool channel
20: endoscope treatment tool
21: insertion part
22: operating part
23: distal end part
24: grip part
25: bendable part
26: soft portion
27: transmitting part
28: transmitting member
30: grip claw
31: link member
32: support
33: pin
34: pin
35: wire
40: tubular member
41: restraining member
42: proximal end part
43: distal end part
50: operating part body
51: operating member
60: first member
61: second member
62: engaging part
63: engaging part
64: side surface (engaging surface)
64: side surface
65: side surface (engaging surface)
65: side surface
90: high-frequency forcep
120: endoscope treatment tool
121: insertion part
122: operating part
123: distal end part 124: grip part
125: bendable part
126: soft portion
127: transmitting part
128: transmitting member
130: grip claw
131: link member
132: support
134: pin
140: tubular member
141: restraining member
150: operating part body
151: operating member
160: first member
161: second member
162: engaging part
163: engaging part
164: side surface
165: side surface
270: endoscope treatment tool
271: operating part
272: gripped part
272a: fixing member
273: piston
273a: shaft part
273b: rotating member
275: transmitting part
276: first transmitting member
277: second transmitting member
280: cyclic member
280A: first portion
280B: second portion
281: pin
282: wire
283: first guide
284: second guide
311: cam member
311a: cam groove
312: cam pin
420: endoscope treatment tool
421: insertion part
440: cyclic portion
440A: first portion
440B: second portion
441: connecting portion
LA: lesion part
X: central axis
Y1: first rotation axis
Y2: second rotation axis

What is claimed is:

1. A treatment tool for an endoscope comprising:
an insertion part that has a distal end part, which is provided with an openable and closable grip part, and a bendable part, which is provided adjacent to the distal end part and is bendable, and that is insertable into a body;
an operating part into which an operation of closing the grip part and an operation of bending the bendable part are input; and
a transmitting part that transmits the operations of the operating part to the grip part and the bendable part,
wherein the operating part has an operating member that is rotatable about a first rotation axis and is translatable along the first rotation axis,
the transmitting part has
a transmitting member that extends from the operating member to the insertion part and is capable of transmitting a rotation and translation of the operating member,
a first member that is rotatable about a second rotation axis matching a central axis of the insertion part, is translatable along the second rotation axis, and is connected to a distal end part of the transmitting member so that the first member is provided between the transmitting member and the bendable part, and
a second member that is rotatable about the second rotation axis and is not translatable along the second rotation axis,
the first member has an engaging part and the second member has an engaging part, and the engaging part of the first member and the engaging part of the second member are engaged with each other, thereby allowing a translation of the first member along the second rotation axis relative to the second member and preventing a relative rotation between the first member and the second member about the second rotation axis,
the grip part is configured to be capable of being closed based on one of translation of the first member or a rotation of the second member, and
the bendable part is configured to be capable of being bent based on other of the translation of the first member or the rotation of the second member.

2. The treatment tool for an endoscope according to claim 1,
wherein each of the engaging part of the first member and the engaging part of the second member has an engaging surface that extends parallel to the second rotation axis and intersect a circumferential direction about the second rotation axis.

3. The treatment tool for an endoscope according to claim 1,
wherein the transmitting member is a coil spring.

4. The treatment tool for an endoscope according to claim 1,
wherein the bendable part has
a tubular member that bends in one direction in an unrestrained state and is elastically deformable, and
a restraining member that is capable of restraining the tubular member in a linear shape,
the restraining member is bonded to the second member, and
in response to the rotation of the second member, the restraining member covers a bent inner diameter portion in bending of the bendable part in the one direction and restrains the bendable part in a linear shape by covering the bent inner diameter portion, or the restraining member covers a bent outer diameter portion in the bending of the bendable part in the one direction and releases restraint of the bendable part by covering the bent outer diameter portion.

5. The treatment tool for an endoscope according to claim 4,
wherein the transmitting part has a wire that connects the grip part and the first member to each other through the bendable part, and
in response to the translation of the first member, the wire is pulled to a side of the first member or is pushed to a side of the grip part, thereby closing the grip part.

6. The treatment tool for an endoscope according to claim 1,
wherein the bendable part has a tubular member that bends in one direction in an unrestrained state and is elastically deformable, and
a restraining member that is capable of restraining the tubular member in a linear shape, the restraining member is bonded to the first member, and
in response to the translation of the first member, the restraining member covers the bendable part and restrains the bendable part in a linear shape by covering the bendable part, or the restraining member is moved to an operating part side of the bendable part at which the operating part is provided and releases restraint of the bendable part by moving to the operating part side.

7. The treatment tool for an endoscope according to claim 6, wherein the transmitting part has a coil spring that connects the grip part and the second member to each other through the bendable part, and in response to the rotation of the second member, the coil spring expands or contracts, thereby closing the grip part.

8. The treatment tool for an endoscope according to claim 1, wherein the second member is externally fitted or internally fitted to the first member.

9. The treatment tool for an endoscope according to claim 1, wherein the first member and the second member are not bendable.

* * * * *